(12) United States Patent
Hoarau et al.

(10) Patent No.: US 8,786,883 B2
(45) Date of Patent: Jul. 22, 2014

(54) DEVICES AND METHODS FOR PRINT JOB TRACKING USING ASSIGNABLE MOBILE DEVICES

(75) Inventors: Eric Hoarau, San Francisco, CA (US); Jun Zeng, Sunnyvale, CA (US); Giordano B. Beretta, Palo Alto, CA (US); I-Jong Lin, Half Moon Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 432 days.

(21) Appl. No.: 13/160,313

(22) Filed: Jun. 14, 2011

(65) Prior Publication Data

US 2012/0320407 A1    Dec. 20, 2012

(51) Int. Cl.
*G06F 3/12* (2006.01)

(52) U.S. Cl.
USPC ..... 358/1.15; 358/1.14; 705/7.27; 340/572.1; 340/539.1; 340/12.5; 340/12.51; 340/13.25; 235/376

(58) Field of Classification Search
CPC ... G06F 3/1275; G06F 3/1204; G06F 3/1296; G06F 3/1208; G06F 3/1264; G06F 3/1292; G06F 3/1273; G06F 3/1294; G06Q 10/0633
USPC ............ 358/1.14, 1.15; 705/7.27; 340/572.1, 340/539.1, 12.5, 12.51, 13.25, 13.26; 235/376

See application file for complete search history.

(56) References Cited

U.S. PATENT DOCUMENTS

| | | | |
|---|---|---|---|
| 5,287,194 A * | 2/1994 | Lobiondo | 358/296 |
| 6,573,910 B1 | 6/2003 | Duke et al. | |
| 6,633,821 B2 | 10/2003 | Jackson et al. | |
| 7,046,384 B2 | 5/2006 | Ferlitsch et al. | |
| 7,242,302 B2 | 7/2007 | Rai et al. | |
| 7,349,116 B2 | 3/2008 | Wichers | |
| 2005/0182757 A1* | 8/2005 | Hull et al. | 707/3 |
| 2006/0226980 A1* | 10/2006 | Rai et al. | 340/572.1 |
| 2010/0073712 A1 | 3/2010 | Cain | |
| 2010/0085594 A1 | 4/2010 | Williams | |
| 2010/0214598 A1 | 8/2010 | Hoppenot et al. | |
| 2012/0320405 A1* | 12/2012 | Giannetti et al. | 358/1.15 |
| 2012/0320406 A1* | 12/2012 | Giannetti | 358/1.15 |

* cited by examiner

*Primary Examiner* — Jacky X Zheng

(57) ABSTRACT

Devices and methods for tracking a print job using an assignable electronic device on a print service provider (PSP) production floor are provided. One such method includes scanning a barcode-enabled job ticket assigned to a print job using a mobile electronic device assigned to a location on a print service provider production floor and sending barcode data from the barcode-enabled job ticket from to a PSP controller. The mobile electronic device may receive workflow instructions associated with the print job from the PSP controller. In addition, the mobile electronic device may display a representation of the workflow instructions.

18 Claims, 18 Drawing Sheets

DEVICES AND METHODS FOR PRINT JOB TRACKING USING ASSIGNABLE MOBILE DEVICES

BACKGROUND

Despite the onset of the "electronic age," there is still significant demand for print products. Indeed, commercial print often may have annual retail sales totaling more than $700 billion. Print service providers (PSPs) fulfill the demand for print products by printing a vast array of print products, such as photographs and brochures, school course materials, periodicals and books, and advertisements and product packaging.

Processing a print job may involve four stages of production: pre-press, press, post-press, and shipping. The PSP may determine a workflow to complete the print job using various print machines on its production floor. Some of these print machines may be digitally connected to a workflow controller. Communication between digitally connected print machines and the workflow controller may take place using a printing standard, such as job messaging format (JMF) and/or job definition format (JDF).

Large numbers of other print machines still used by a PSP may not be connected to the workflow controller, thereby falling in a "digital dead-zone." For this reason, PSPs may print a job ticket at the outset of print production detailing all the steps needed to complete the print job. This approach works most of the time, but a scheduling nightmare can result when a print machine breaks or when certain parts of the job take longer than expected. In this stressful environment, a floor manager may have to make on-the-fly decisions to keep smooth print production on the PSP floor. However, these on-the-fly decisions could affect the next batch of print jobs entering the process, and workflows determined by the workflow controller may not accurately reflect the actual situation on the print production floor.

DETAILED DESCRIPTION

Unless a workflow controller used by a print service provider (PSP) is aware of the circumstances on the PSP production floor, the workflow controller cannot effectively reroute print jobs or reorganize print resources dynamically as the situation on the PSP production floor changes. The present disclosure thus relates to increasing the digital connectedness of the PSP print machines and print jobs using electronic devices. These electronic devices may communicate with the PSP controller to allow the PSP controller to track the job status of each print job and to provide updated workflow information in a real-time job ticket (RTJT). As used herein, the term "real-time job ticket (RTJT)" generally refers to workflow instructions that can be updated in real time.

The real-time job ticket (RTJT) may be sent from the PSP controller to an electronic device that is "working with" a particular print job. As used herein, an electronic device may be understood to be "working with" a print job when the electronic device knows the identity of the print job and communicates with the PSP controller about the print job. In one example, a mobile device may be assigned to a print job to operate as the real-time job ticket (RTJT), following the print job as it progresses through the workflow on the PSP production floor. In another example, an electronic device may read a radio frequency identification (RFID) badge assigned to a print job or may scan a barcode on a barcode-enabled paper job ticket assigned to a print job to ascertain its identity. Once working with the print job, the electronic devices may receive workflow instructions from the PSP controller indicating subsequent processing steps for the print job. The electronic devices also may send job status indications to the PSP controller to allow the workflow controller to collect statistics and update print job workflows dynamically as conditions on the PSP production floor change.

Technical effects of the present disclosure include real-time monitoring of a print job as it progresses through a workflow irrespective of whether it is processed by a digitally-connected print machine or a non-digitally-connected print machine. Additionally, if conditions on the PSP production floor change, the PSP controller can dynamically reroute a print job as desired. Moreover, for both digitally-connected and non-digitally-connected print machines, the PSP controller may be able to track real-time PSP production floor 10 data. Accordingly, accurate PSP production floor data can be obtained for visualization and auditing purposes.

Figure 1:
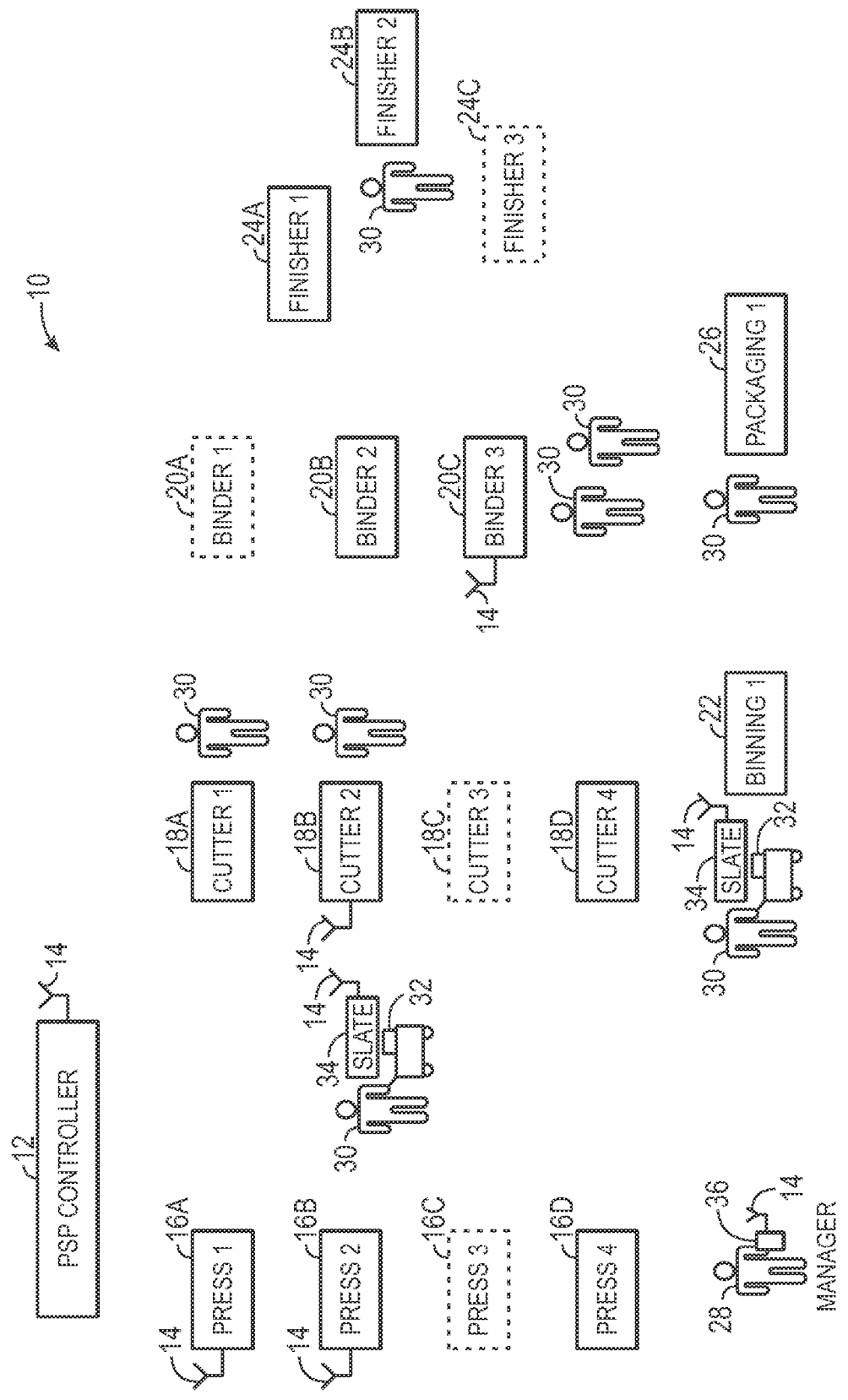
FIGS. 1-3 are schematic block diagrams illustrating an example of a production floor of a print service provider (PSP) controlled by a workflow controller in communication with various mobile electronic devices, in accordance with embodiments.
Figure 2:
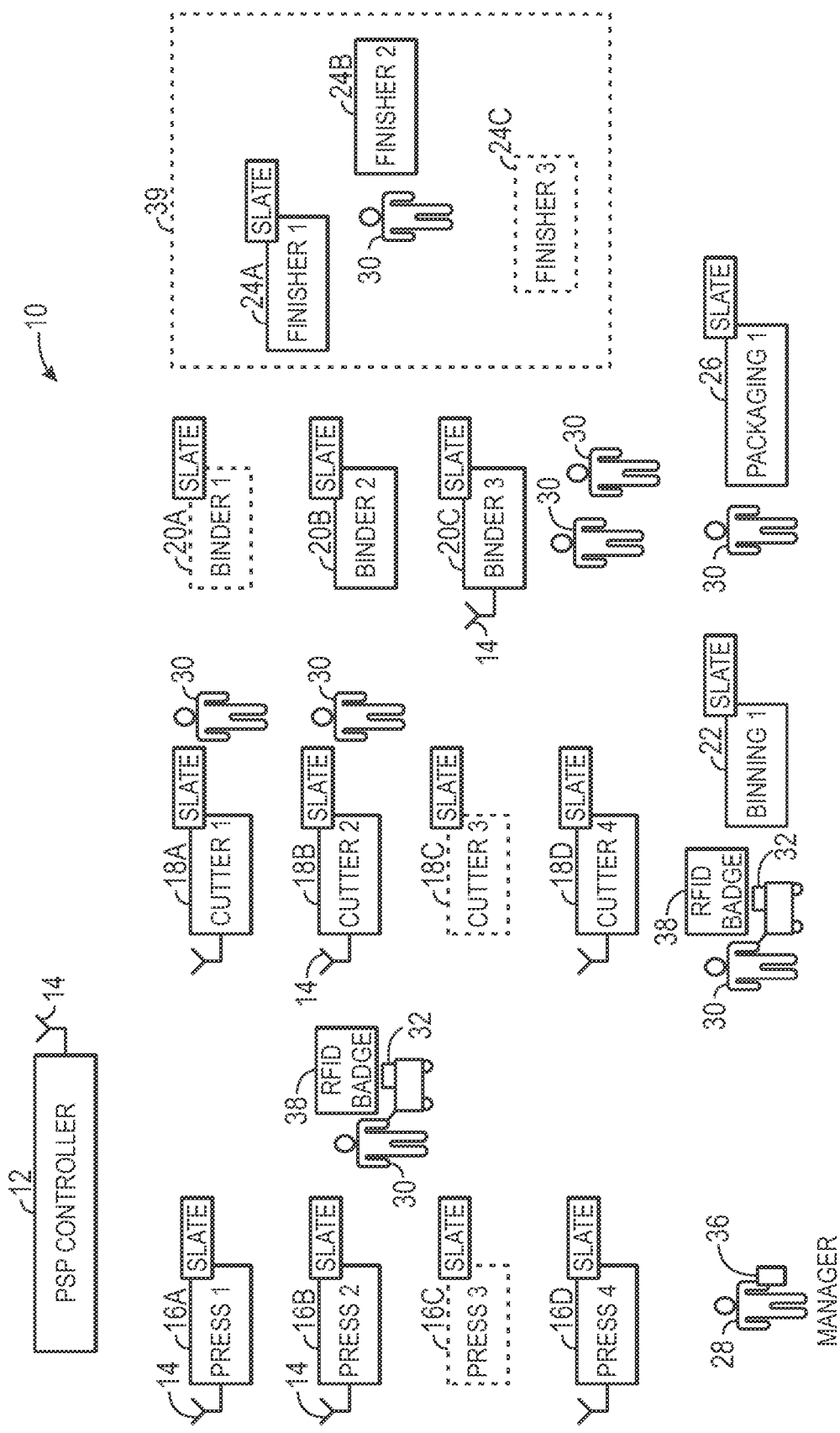
Figure 3:
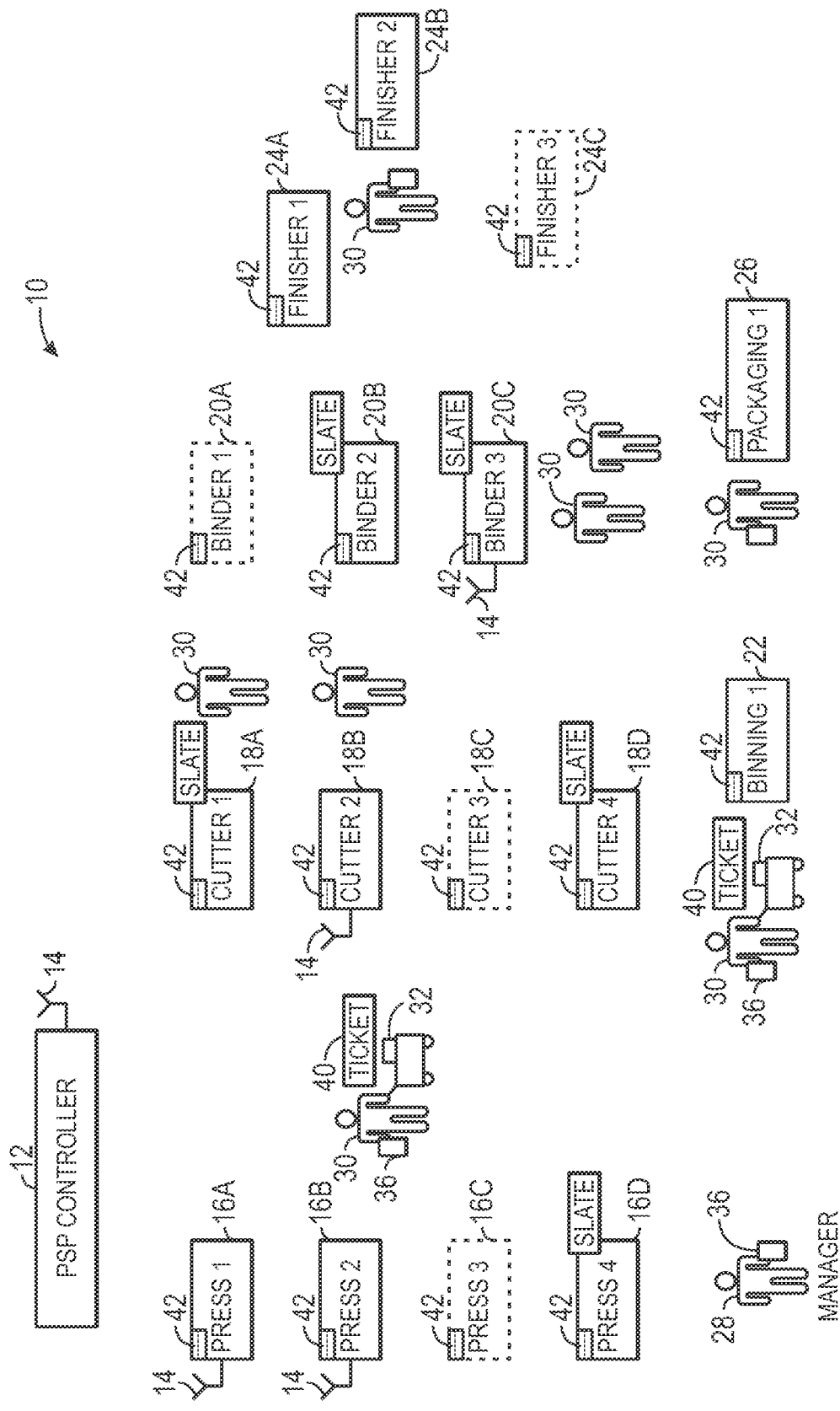

With the foregoing in mind, FIGS. 1-3 represent various examples of a print service provider (PSP) production floor 10 in which certain electronic devices can assist a PSP controller 12 to track a print job 32 moving through a workflow to completion. In each of FIGS. 1-3, a PSP controller 12 may share a network connection 14 with various other print machines and mobile devices. The PSP controller 12 may determine a workflow for each print job 32 being processed through print machines on the PSP production floor 10. In the example of FIGS. 1-3, the PSP production floor 10 includes several printing presses 16A, 16B, 16C and 16D; several cutters 18A, 18B, 18C, and 18D; a number of binders 20A, 20B, and 20C; a binning area 22; several finishers 24A, 24B, and 24C; and packaging machine 26. In an actual implementation, any suitable number and variety of print machines may be employed.

A manager 28 may manage the PSP production floor 10, overseeing workers 30 that perform various tasks on the PSP production floor 10. For example, the manager 28 and/or the workers 30 may carry print jobs 32 from one stage of a workflow (e.g., a first print machine) to a next stage in the workflow (e.g., a second print machine). To provide one brief example, a print job 32 may begin with various pre-press processes before being printed on one of the printing presses 16A, 16B, 16C, and/or 16D. Workers 30 may pick up and transport the now-printed print job 32 to a cutter 18A, 18B, 18C, and/or 18D. After cutting, the print job 32 may be taken to one of the binders 20A, 20B, and/or 20C to be bound. Finally, a worker 30 may take the bound print job 32 to be packaged at the packaging machine 26 before being shipped.

As illustrated in FIGS. 1-3, some of the print machines of the PSP production floor 10 may have network connections 14 that allow them to communicate with the PSP controller 12. Such communication may take place, for example, in the job definition format (JDF) and/or job messaging format (JMF) standards. In the example of FIGS. 1-3, the printing presses 16A and 16B, the cutter 18B, and the binder 20C are all digitally connected to the PSP controller 12. These digitally connected print machines may allow the PSP controller 12 to keep accurate statistics of how long it takes to process a print job 32 by communicating the job status of the print job 32 over the network connection 14. In addition, if a digitally connected print machine becomes unavailable for any reason, the digitally connected print machine may be able to indicate as such to the PSP controller 12. The PSP controller 12 may dynamically adjust the workflows of at least some of the print jobs 32 to account for the change of circumstances on the PSP production floor 10.

Other print machines on the PSP production floor 10 illustrated in FIGS. 1-3 may not, on their own, be digitally connected to the PSP controller 12. These print machines in the "digital dead-zone" may still have considerable value to the PSP that owns the PSP production floor 10. Since the non-digitally-connected print machines do not communicate directly with the PSP controller 12, when they become unavailable, these non-digitally-connected print machines cannot notify the PSP controller 12. By way of example, the printing press 16C, the cutter 18C, the binder 20A, and the finisher 24C are illustrated in the examples of FIGS. 1-3 as being currently unavailable. The PSP controller 12 may need to be aware that these print machines are not currently available to develop accurate workflow instructions associated with the print jobs 32 on the PSP production floor 10.

As a print job 32 is processed on the PSP production floor 10 through digitally connected and/or non-digitally-connected print machines, the manager 28 and/or the workers 30 may use certain electronic devices to indicate the current status of the print jobs 32 and to receive workflow instructions from the PSP controller 12. In the examples shown in FIGS. 1-3, these electronic devices include mobile devices in the form of slates 34 and/or handheld devices 36. As will be discussed below, the slates 34 and/or handheld devices 36 may be models of the HP TouchPad, models of the HP Veer, and/or models of the HP Pre 3, to name a few examples. The slates 34 and/or handheld devices 36 may begin to "work with" a print job 32 by being assigned to a print job 32 to operate as a real-time job ticket (RTJT) (FIG. 1), may read a radio frequency identification (RFID) badge 38 assigned to a print job 32 (FIG. 2), and/or may scan a barcode-enabled paper job ticket 40 assigned to a print job 32 (FIG. 3). When the slates 34 and/or handheld devices 36 are working with a particular print job 32, the slates 34 and/or handheld devices 36 may receive workflow instructions from the PSP controller 12 to indicate to the manager 28 and/or the workers 30 of the next step in the workflow associated with the print job 32. Additionally or alternatively, the slates 34 and/or handheld devices 36 may provide other job status information regarding the workflow of the print job 32. It should be appreciated that any suitable electronic devices are envisaged and that the slates 34 and/or handheld devices 36 are provided by way of example. For example, the electronic devices used on the PSP production floor 10 may alternatively be desktop computers, notebook computers, e-readers, or any other suitable form of electronic device.

In the example of FIG. 1, mobile devices such as the slates 34 and/or handheld devices 36 are assigned to print jobs 32 to operate as real-time job tickets (RTJTs). Although the example of FIG. 1 specifically illustrates the use of a slate 34 to operate as a real-time job ticket (RTJT) associated with a print job 32, it should be appreciated that any suitable mobile device may be employed. For example, a handheld device 36, a notebook computer, an e-reader, and the like, may alternatively be assigned to a print job 32. Once the slate 34 is assigned to the print job 32, the slate 34 may follow the print job 32 over the PSP production floor 10 until the print job 32 has been completed.

Using the slate 34 to operate as a real-time job ticket (RTJT) may eliminate certain limitations of a printed job ticket. Namely, the PSP controller 12 may dynamically update the workflow of the print job 32 in response to live conditions on the PSP production floor 10 (e.g., temporary unavailability of a print machine). In addition, using the slate 34 as a real-time job ticket (RTJT) may provide a seamless way to monitor the status of the print job 32, allowing accurate statistics to be collected on the time the print job takes to be completed on the PSP production floor 10. When a slate 34 is operating as a real-time job ticket (RTJT), the slate 34 may communicate with the PSP controller 12 and/or the digitally connected print machines using, for example, the job definition format (JDF) and/or the job messaging format (JMF) standards. Thus, the PSP controller 32 may remain aware of the status of the print job 32 and status of the various print machines of the PSP production floor 10 even when the print job 32 is being processed on a non-digitally-connected print machine (e.g., the cutter 18A).

In the example of FIG. 2, a radio frequency identification (RFID) badge 38 may be assigned to a print job 32 as a reusable job ticket that can identify the print job 32 to slates 34 assigned to print machines or cells 39 of print machines. Additionally or alternatively, a barcode-enabled paper job ticket may be used in place of the RFID badge 38, similar to that described below with reference to FIG. 3. Although the example of FIG. 2 specifically illustrates the use of a slate 34 associated with a print machine, it should be appreciated that any suitable electronic device may be employed. For example, a desktop computer, a notebook computer, a handheld device 36, an e-reader, or the like may alternatively be assigned to a print machine or a cell 39 of print machines. In the example of FIG. 2, each of the print machines of the PSP production floor 10 generally may have a slate 34 associated with it at all times. In some cases, a single slate 34 may be shared by a cell 39 (i.e., a group of related print machines that may or may not operate in concert and/or may operate under the supervision of a common group of workers 30). For example, the finishers 24A, 24B, and 24C shown in FIG. 2 all share a single slate 34 in a cell 39.

When a slate 34 reads an RFID badge 38, the slate 34 may begin to "work with" the print job 32 associated with the RFID badge 38. The slate 34 may communicate with the PSP controller 12 and/or the digitally connected print machines using, for example, the job definition format (JDF) and/or the job messaging format (JMF) standards. By way of example, the PSP controller 12 may associate a unique identifier in the RFID badge 38 with a unique job identifier (e.g., a JobID in the job definition format (JDF) and/or the job messaging format (JMF) standards). Once associated with the print job 32, the RFID badge 38 may be read by the slate 34 (if capable of reading RFID badges) or a separate RFID reader coupled to the slate 34. The slate 34 then may communicate with the PSP controller 12 to receive workflow instructions associated with the corresponding print job 32, and also may provide job status information associated with the print job 32. In this way, the PSP controller 32 may remain aware of the status of the print job 32 and status of the various print machines of the PSP production floor 10 even when the print job 32 is being processed on a non-digitally-connected print machine (e.g., the cutter 18A).

In the example of FIG. 3, a barcode-enabled paper job ticket 40 may be assigned to a print job 32 that can identify the print job 32 to slates 34 and/or handheld device 36 on the PSP production floor 10. Additionally or alternatively, a radio frequency identification (RFID) chip may be used in place of the barcode-enabled paper job ticket 40, similar to that described above with reference to FIG. 2. Although the example of FIG. 3 specifically illustrates the use of a slate 34 associated with a print machine and/or a handheld device 36 associated with a worker 30, it should be appreciated that any suitable electronic devices may be employed in any suitable placement. For example, a desktop computer, a notebook computer, a handheld device 36, an e-reader, or the like may alternatively be assigned to a print machine or a worker 30. Moreover, as discussed below, the slates 34 and/or handheld devices 36 may not be permanently assigned to a single print machine or worker 30. Rather, the slates 34 and/or handheld devices 36 may be assigned occasionally (e.g., by shift or daily) and linked to a particular print machine and/or worker 30 only when needed.

When a slate 34 and/or handheld device 36 scans a barcode-enabled paper job ticket 40 assigned to a print job 32, the slate 34 and/or handheld device 36 may begin to "work with" that print job 32. Specifically, a barcode-enabled paper job ticket 40 may encode a unique identifier that can be associated in the PSP controller 12 with a specific job identification number (e.g., a JobID in the job definition format (JDF) and/or the job messaging format (JMF) standards). A worker 30 may scan the barcode-enabled paper job ticket 40 using, for example, a camera or barcode scanner coupled to a slate 34 associated with a print machine and/or a handheld device 36 associated with a worker 30. By scanning the barcode-enabled paper job ticket 40 associated with a print job 32, the slate 34 and/or handheld device 36 may communicate with the PSP controller 12, obtaining workflow instructions and/or providing current job status information. If the conditions on the PSP production floor change (e.g., a print machine becomes unavailable), the PSP controller 12 may determine an updated workflow for the print job 32, which may be indicated on the slate 34 and/or handheld device 36 when the barcode-enabled ticket 40 associated with the print job 32 is scanned.

It should be further appreciated that, in the example of FIG. 3, each of the print machines of the PSP production floor 10 may have a unique identifier 42 (e.g., a barcode). These unique identifiers 42 may allow limited numbers of mobile devices such as slates 34 and/or handheld devices 36 to be linked with certain print machines. Thus, for example, when a print machine (e.g., the printing press 16C) becomes unavailable, a slate 34 may be moved to a working print machine (e.g., the printing press 16B). Moreover, since different seasons may generally involve print jobs 32 that need different print machines, the PSP controller 12 may occasionally determine which print machines and/or workers 30 the slates 34 and/or handheld devices 36 should be linked to (e.g., each shift or each day). Furthermore, it may be appreciated that some workflow steps are simple enough and of sufficiently low risk that they may not involve a slate 34 and/or handheld device 36 (e.g., the stitching of the book block). For steps such as these, only a simple instruction may be placed on the barcode-enabled paper job ticket 40. Electronic job tracking may be carried out by a worker 30 using a handheld device 36, moving the print job 32 from one station to the next.

Even when a print machine or staging area of the PSP production floor 10 does include a slate 34 and/or handheld device 36, job status information may be collected only occasionally. To provide a brief example, the slate 34 at the binder 20B (which is not otherwise in communication with the PSP controller 12) may not always track each step in the workflow process that is performed at the binder 20B. Rather, a worker 30 that is operating the binder 20B may only occasionally be prompted by the slate 34 to provide job status information. The slate 34 may be acting, for example, in response to communication from the PSP controller 12. The frequency or location in the workflow at which a slate 34 on the PSP production floor 10 requests job status information may depend, for example, on a statistical sampling methodology.

Such a statistical sampling methodology may be tailored to minimize entry from workers 30 as a manner of alternate logging of print jobs 32, and/or to emphasize areas of historical or potential mistake. In this way, although the PSP controller 12 may not always collect feedback on every print job 32, which could reduce some worker 30 efficiency, the PSP controller 12 may achieve a statistical understanding of the operation of the PSP production floor 10.

In the example of FIGS. 1-3, two types of mobile devices are shown being used on the PSP production floor 10. Specifically, slates 34 can be used mainly at the print machine level, having a larger screen to easily communicate an interface with the workers 30. The slates 34 may communicate representations of the workflow instructions from the PSP controller 12, (e.g., job requirements), can request information about the status of a job, and may communicate performance metrics for carrying out a process. The smaller handheld devices 36 can be used by the workers 30 to learn from the PSP controller 12, for example, the location and destination of print jobs 32. Also, by way of example, some of the mobile devices on the PSP production floor 10 may be used by the manager 28 to learn the status of an individual print job 32, access general PSP production floor 10 information, and to interact with the workflow management software running on the PSP controller 12.

In general, a slate 34 may be used to communicate real-time workflow instructions and requirements from the PSP controller 12 to the worker 30. Considering the example of FIG. 3 in particular, when a worker 30 scans the barcode-enabled paper job ticket 40, the slate 34 may send this identifying information to the PSP controller 12. In turn, the PSP controller 12 can reply with up-to-date workflow instructions on what needs to be done to complete the job of the print job 32. The level of details in the workflow instructions could be a factor of several variables such as the potential for errors on the particular print machine, the skill level of the worker 30, the previous job set-up on the print machine, and so forth. Thus, the workflow instructions can be presented in a layered or hierarchical approach with key details in the first layer to minimize the processing time. The worker 30 may be able to access the rest of the workflow instructions, if needed or desired, by requesting more information from the slate 34 and/or handheld device 36. By way of example, the level of details in the workflow instructions required for each process, print job 82, and/or worker 30 combinations can be determined based on analysis from historical data. Further, as will be discussed below, once finished with a stage in the workflow of the print job 32, the worker 30 may be able to select a user-selectable representation of the job status information to inform the PSP controller 12 that the current task has been completed. Such transactions may be time-stamped to be used in the scheduling and auditing process by the PSP controller 12.

The slates 34 and/or handheld devices 36 may also be used by the PSP controller 12 to specifically request and/or verify the state of a print job 32 or the state of a print machine. For example, if the PSP controller 12 has identified an unexpected behavior, such as a missing job component or longer-than-expected processing, the PSP controller 12 may request clarification from the worker 30 and may adjust the workflows of the print job 32 and others accordingly. Additionally or alternatively, the slate 34 and/or handheld device 36 can be used to access the print machine log, maintenance information, and can be used as a communication tool (e.g., instant messaging, voice, and/or video) for remote diagnosis and repair.

Moreover, at a time when a worker 30 is not processing a print job 32, the PSP controller 12 can send informational data to the slate 34 and/or handheld device 36 to help improve the overall PSP production floor 10 efficiency. For example, performance metrics can help workers 30 improve their productivity, or a map of the PSP production floor 10 can visualize where bottlenecks that need attention are located. Another powerful use model of the slates 34 and/or handheld devices 36 may involve enabling the control and set-up of print machines that are digital but not compliant with the job definition format (JDF) standard. For example, when a software driver for a digital print machine is available, the slates 34 and/or handheld devices 36 may be connected to the digital, but non-digitally-connected print machine using a cable and may become the interface for the PSP controller 12 to send and receive simple commands about a print job 32 or to obtain the print machine status, planning, and/or scheduling.

Before continuing further, it may be noted that the floor manager 28 may have a significant responsibility on the PSP production floor 10. This responsibility can be assisted by the collection of real-time job status information by the PSP controller 12 as generally illustrated in FIGS. 1-3. Keeping track of all of the processes and making decision on-the-fly can be a daunting task. A mobile device such as a slate 34 and/or handheld device 36, may be a great tool to access and visualize real-time information to make informed decisions, and to send commands to the PSP controller 12. By way of example, the manager 28 may employ the slate 34 and/or handheld device 36 for information visualization and interaction with the workflow.

As may be appreciated, information retrieval in a meaningful way may require deep, domain-specific knowledge that is beyond general personnel involved in commercial print (e.g., querying language such as PHP to extract and manipulate data within a database, statistical procedures to explore and discover patterns that can serve as the basis for new rule generation, and so forth). When the PSP controller 12 has trapped the job status information associated with each print job 32, the PSP controller 12 may be place in a database, be cleaned and filtered, and thus may enable fast retrieval onto the slates 34 and/or handheld devices 36. Many possible interactive environments may be displayed on the slates 34 and/or handheld devices 36. For example, the PSP production floor 10 data may be displayed on a standard query and table graphical user interface (GUI). The PSP production floor 10 data may include data from the PSP controller 12 as well as other sources (e.g., An ERP system or an MES, or other real-time monitoring systems). The slates 34 and/or handheld devices 36 may employ a window management software system that can allow seamless transitions among different viewing windows (e.g., the window management techniques used by commercial computer-aided design packages such as Ansys, Coventor, and so forth). The standard table in a database browser on the slate 34 and/or handheld device 36 may or may not allow the manger 28 or worker 30 to see the raw data and do standard database queries. The GUI of the slates 34 and/or handheld devices 36 may show the PSP production floor 10 data overlaid over a representation of the PSP production floor 10.

By way of example, the slates 34 and/or handheld devices 36 may display a graphic rendering of the actual PSP production floor 10 data can be overlaid. Since the PSP production floor 10 may employ different layouts depending on the conditions on the PSP production floor 10, the manager 28 or worker 30 may select the particular layout or the particular layout may be extracted from the PSP production floor data, if present. The manager 28 and/or worker 30 may be able to select a particular time period, such as a particular shift, during which PSP production floor data 10 was collected by the PSP controller 12. If a production exception was recorded in the PSP production floor 10 data, or found while uploading the data, such an event may be highlighted to the manager 28 and/or worker 30. The manager 28 and/or worker 30 may visualize the PSP production floor data over time using, for example, a time slider, since much of the PSP production floor 10 data may include a time stamp. Examples of the PSP production floor 10 data that may be visualized include (1) queue volume at each print machine or group of print machines, (2) print machine utilization or status (e.g., capacity, breakdown, maintenance, working, and so forth), (3) a specific print job 32 or set of print jobs 32 as they are moved through the production cycle on the PSP production floor 10, (4) worker 30 position tracking, (5) specific events that were flagged as potential areas or potentially of interest, (6) a specific timeline of interest, and/or (7) notes or flags to events, print machines, or workers 30 for future reference. It may be further appreciated that the slates 34 and/or handheld devices 36 may also be used for scheduling and/or planning. To provide one brief example, the slates 34 and/or handheld devices 36 may display a program evaluation and review technique (PERT) chart highlighting the critical path. Additionally, it may be appreciated that, in some embodiments, sensitive data may be protected using a data security system. For example, the manager 28 may be able to see all print data, while workers 30 may see only aggregated data, data associated with a particular print machine, or data associated with a specific relevant event.

Figure 4:
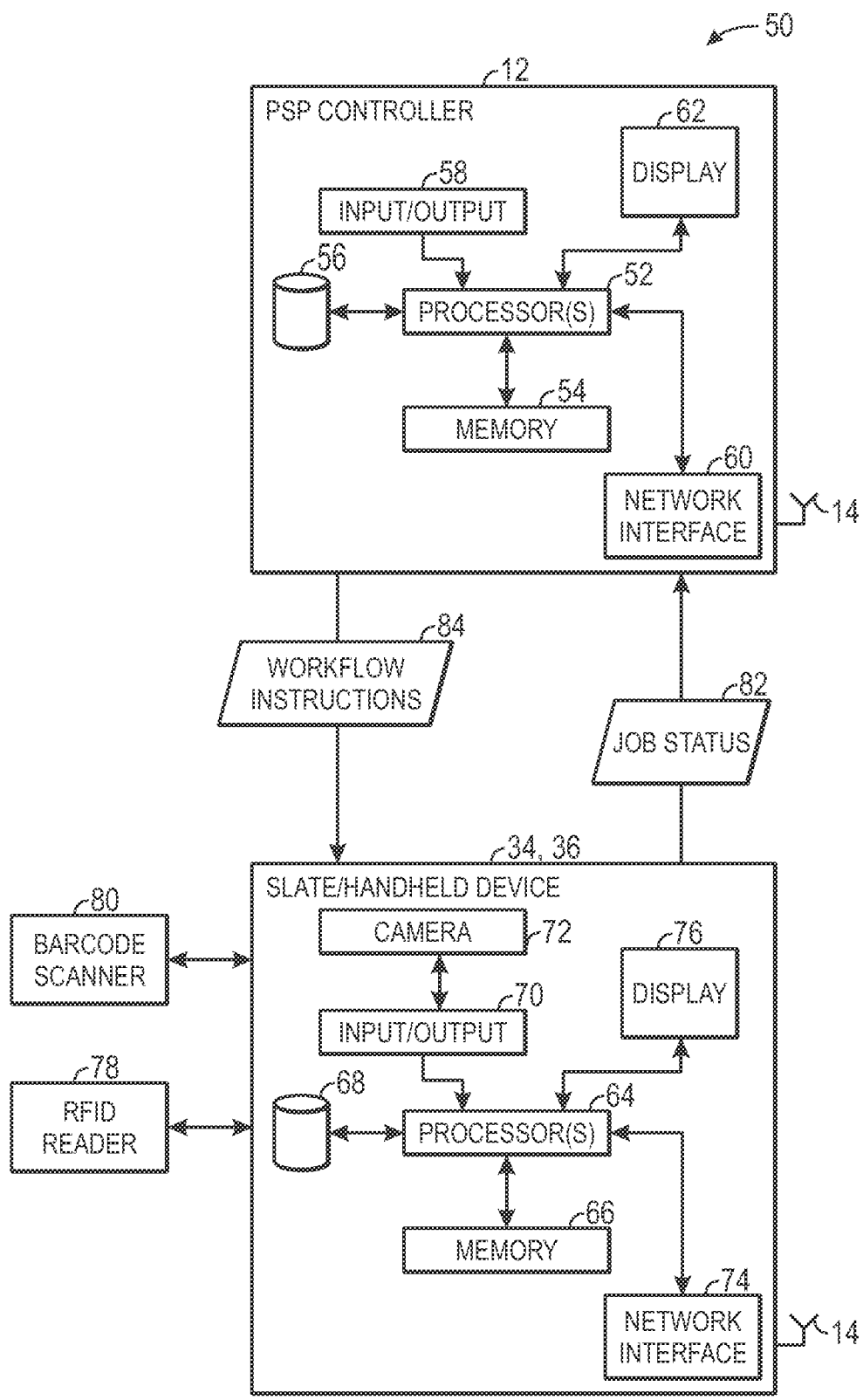
FIG. 4 is a block diagram of communication that may take place between a PSP controller and a mobile device on the print production floor, in accordance with an embodiment.

Turning next to FIG. 4, an example of communication that may take place between the PSP controller 12 and the mobile devices such as the slates 34 and/or handheld devices 36 (and, in some cases, desktop computers) on the PSP production floor 10 appears in a communication diagram 50. The communication diagram 50 also illustrates various components that may make up the PSP controller 12 and/or the slates 34 and/or handheld devices 36. As shown in FIG. 4, the PSP controller 12 and the slate 34 and/or handheld device 36 may represent any suitable computer system capable of performing the techniques disclosed herein. The various functional blocks of the PSP controller 12 and the slate 34 and/or handheld device 36 may include hardware elements, processor-executable instructions, or a combination of both. The blocks of the PSP controller 12 and the slate 34 and/or handheld device 36 are intended to represent only one example of a particular implementation. In other implementations, the PSP controller 12 and the slate 34 and/or handheld device 36 may have more or fewer components, as desired. By way of example, the PSP controller 12 may be a model of an HP server, desktop, or notebook computer and the slate 34 and/or handheld device 36 may be a model of the HP TouchPad, a model of the HP Veer, and/or the a model of the HP Pre 3.

In the PSP controller 12, processors 52 and/or other data processing circuitry may be operably coupled to memory 54 and storage 56 to execute instructions for carrying out the presently disclosed techniques. These instructions may be encoded in programs that may be executed by the processors 52. The instructions may be stored in any suitable article of manufacturer that includes at least one tangible, computer-readable medium that at least collectively stores these instructions or routines, such as the memory 54 or the storage 56. The memory 54 and the storage 56 may include, for example, random-access memory, read-only memory, rewritable memory, a hard drive, and/or optical discs.

The PSP controller 12 also may include input/output (I/O) ports 58 as well as a network interface 60. The network interface 60 may provide communication via a personal area network (PAN) (e.g., Bluetooth), a local area network (LAN) (e.g., Wi-Fi), a wide area network (WAN) (e.g., 3G or LTE), and/or the like. Through the network interface 60, the PSP controller 12 may communicate over a wireless network 14 for example, to enable cloud storage, processing, and/or communication with other networked devices, such as the slate 34 and/or handheld device 36. A display 62 of the PSP controller 12 may display a graphical user interface (GUI) of the PSP controller 12. As should be appreciated, the PSP controller 12 may include a variety of other components, such as a power supply, a keyboard, a mouse, a track pad, and/or a touch screen interface, and so forth. By way of example, the PSP controller 12 may be, or may be associated with, a manufacturing execution system (MES) used by the PSP to control how the print jobs 32 are fulfilled through the PSP production floor 10.

The slate 34 and/or handheld device 36 also may include processors 64, memory 66, and storage 68. Like the processors 52, memory 54, and storage 56 of the PSP controller 12, the processor 64, memory 66, and the storage 68 of the slate 34 and/or handheld device 36 may be used to perform various instructions for carrying out the techniques disclosed herein. Such instructions may be encoded in programs that may be executed by the processors 64 and stored in any suitable article of manufacturer (e.g., the memory 66 and/or storage 68). Thus, by way of example, the memory 66 and/or the storage 68 may store data and/or executable instructions on random-access memory, read-only memory, rewritable memory, a hard drive, and/or optical discs.

The slate 34 and/or handheld device 36 may include one or more input/output (I/O) ports 70, which may be coupled, for example, to an integrated camera 72. As will be described below, the camera 72 may be used to obtain an image of a barcode on a barcode-enabled paper job ticket 40. A network interface 74 may operate in a similar manner to the network interface 60 of the PSP controller 12 and may communicate with the PSP controller 12 via a network connection 14. A display 76 of the slate 34 and/or handheld device 36 may be a touch screen display that allows a manager 28 and/or worker 30 to interact with a user interface of the slate 34 and/or handheld device 36. As mentioned above, a radio frequency identification (RFID) reader 78 and/or a barcode scanner 80 may be operably coupled to the slate 34 and/or handheld device 36. The RFID reader 78 may allow the slate 34 and/or handheld device 36 to read an RFID badge 38 associated with a print job 32. The barcode scanner 80 may allow the slate 34 and/or handheld device 36 to scan a barcode-enabled paper job ticket 40.

As mentioned above, the slate 34 and/or handheld device 36 may "work with" a print job 32. In some embodiments, the slate 34 and/or handheld device 36 may be assigned to a print job 32 to operate as a real-time job ticket (RTJT) (FIG. 1). Additionally or alternatively, the slate 34 and/or handheld device 36 may use the associated RFID reader 78 to scan an RFID badge 38 (FIG. 2) and/or may use the camera 72 or the barcode scanner 80 to scan a barcode-enabled paper job ticket 40 (FIG. 3) to identify the print job 32. In all of these cases, the slate 34 and/or handheld device 36 may communicate information identifying the print job 32 and job status information 82 to the PSP controller 12. The PSP controller 12 may use the job status information 82 provided by the slate 34 and/or handheld device 36 to monitor the print job 32 as it is processed on the PSP production floor 10. The PSP controller 12 also may send workflow instructions 84 to the slate 34 and/or handheld device 36. These workflow instructions 84 may allow the slate 34 and/or handheld device 36 to display, for example, workflow steps the print job 32 is scheduled to take, worker instructions indicating the print machine the print job 32 should be taken to next, various details describing the workflow of the print job 32, and/or instructional videos or animations, for example, explaining a step in the workflow to a worker 30.

Figure 5:
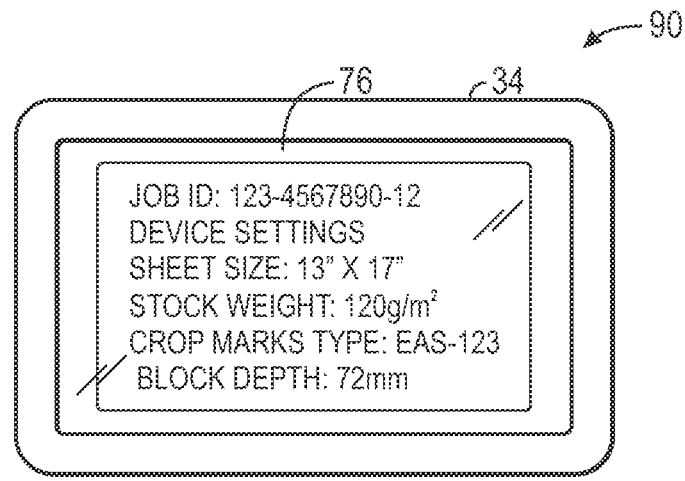
FIG. 5 is a front view of a slate device operating as a real-time job ticket (RTJT) associated with a print job, in accordance with an embodiment.

In one example, a slate 34 may be assigned to a print job 32 to operate as a real-time job ticket (RTJT) 90, as shown in FIG. 5. When the slate 34 is operating as the RTJT 90 associated with a particular print job 32, the slate 34 may follow the print job 32 through the various stages in the workflow as the print job 32 is processed on the PSP production floor 10. Indeed, the slate 34 may be physically coupled with the print job 32 by, for example, a clip, tape, or any other suitable tools of attachment to paper. In the example of FIG. 5, the display 76 is displaying a representation of some of the workflow instructions 84 provided by the PSP 12. Thus, in the example of FIG. 5, the display 76 shows the print job 32 identification number (e.g., the JobID), as well as current print machine settings where the print job 32 is to be taken next. In other examples, the RTJT 90 may display, for example, a flow diagram view of the workflow of the print job 32, a schematic view of PSP production floor, or a representation of where the print job 32 should next be taken by a worker 30, and so forth.

Figure 6:
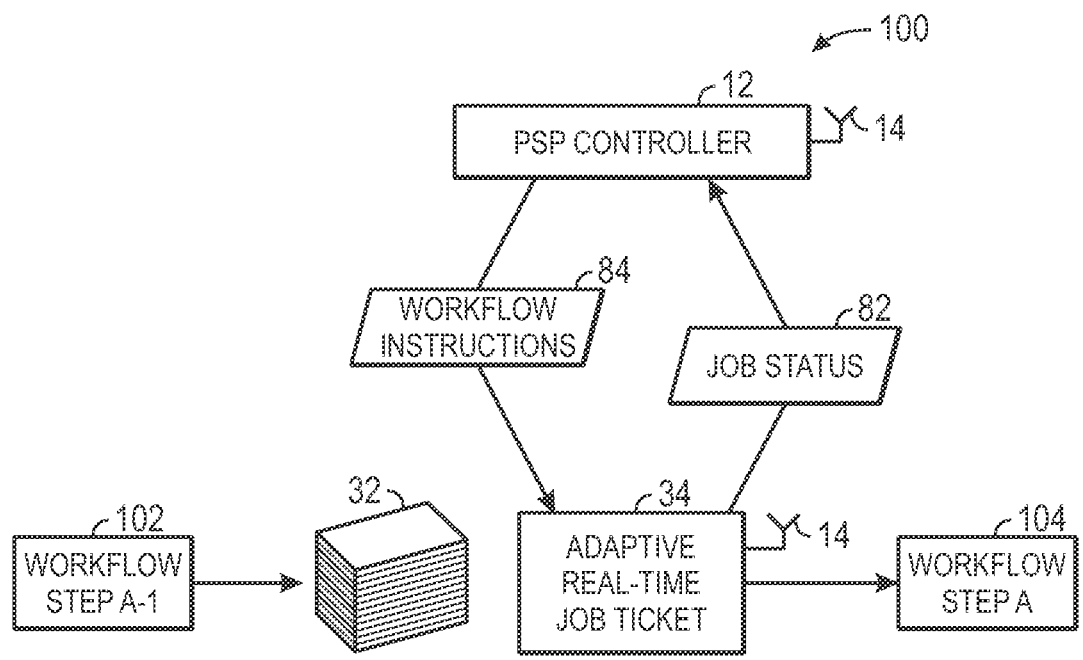
FIG. 6 is a flow diagram illustrating a manner of processing a print job using the slate of FIG. 5 as a real-time job ticket (RTJT) associated with a print job, in accordance with an embodiment.

The adaptive real-time job ticket (RTJT) 90 may provide job status information 82 to the PSP controller 12 as the print job 32 to which it is assigned is processed on the PSP production floor 10. As shown in a flow diagram 100 of FIG. 6, the print job 32 may complete one workflow step (A-1) 102. A slate 34 assigned to the print job 32 as an RTJT 90 may provide job status information 82 indicating to the PSP controller 12 that the workflow step (A-1) 102 has been completed. Additionally or alternatively, the slate 34 may receive workflow instructions 84 from the PSP controller 12 (at approximately the same time or at other times). The slate 34 may display a representation of the workflow instructions 84 such that a worker 30 will know to bring the print job 32 and the slate 34 to complete a next workflow step (A) 104. In some cases, the workflow of the print job 32 may change during or after the completion of the workflow step (A-1) 102 (e.g., because a print machine may become unavailable). Nevertheless, the slate 34 may receive updated workflow instructions 84, and the slate 34 may properly guide the worker 30 to provide the print job 32 to the correct new workflow step (A) 104.

Figure 7:
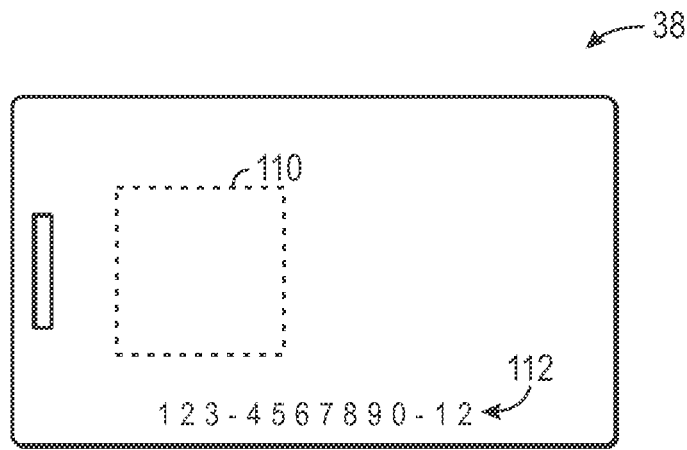
FIG. 7 is a perspective view of a radio frequency identification (RFID) badge used as a job ticket associated with a print job, in accordance with an embodiment.

Additionally or alternatively, a slate 34 and/or handheld device 36 may begin to "work with" a print job 32 by reading an associated RFID badge 38, such as that shown in FIG. 7. As illustrated, the RFID badge 38 may be made of, for example, a reusable substance such as plastic that encases a radio frequency identification (RFID) chip 110. A unique identifier 112 may or may not be printed on the RFID badge 38. When the RFID badge 38 is placed in close proximity to an RFID reader 78, the RFID chip 110 may become energized and may emit an RFID signal that includes a unique identifier. This unique identifier may or may not be the unique identifier 112 printed on the outside of the RFID badge 38. In some cases, the RFID chip 110 may be programmable. As such, an RFID reader 78 may program the RFID chip 110 with a different unique identifier, such as a JobID in the job definition format (JDF) standard, which may be used to identify the print job 32. Additionally or alternatively, the RFID badge 38 may include a model of the Memory Spot chip by HP.

The RFID badge 38 of FIG. 7 may be physically attached to and/or coupled with a print job 32. Because the RFID badge 38 may be made of a durable material such as plastic, liquids such as coffee cannot stain the RFID badge 38 and obscure any workflow-related information (e.g., of the sort that might be printed on a conventional job ticket). Nor can the RFID badge 38 be easily torn or broken. Thus, the RFID badge 38 may be quite robust. Moreover, the RFID badge 38 can be attached to a print job 32 in a variety of forms. For instance, the RFID badge 38 may be attached with tape to printed rolls, paper stacks, and so forth.

Figure 8:
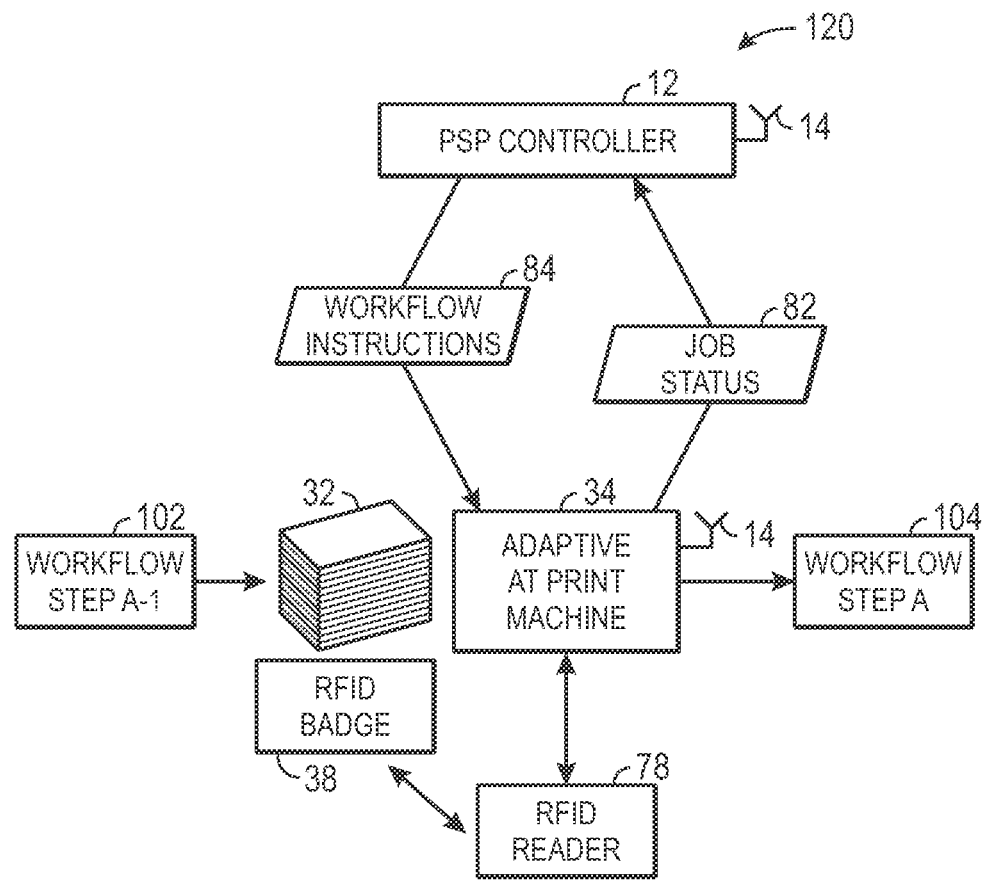
FIG. 8 is a flow diagram illustrating a manner of processing a print job using the RFID badge of FIG. 7 as a job ticket associated with a print job and an electronic device that has scanned the RFID badge, in accordance with an embodiment.

The unique identifier emitted by the RFID chip 110 may allow an electronic device such as a slate 34 with an RFID reader 78 to identify the print job 32, as shown in a flow diagram 120 of FIG. 8. In the flow diagram 120 of FIG. 8, a print job 32 associated with an RFID badge 38 has just completed a workflow step (A-1) 102. A slate 34 located at a print machine may obtain the unique identifier from the RFID chip 110 of the RFID badge 38, determining an identity of the print job 32 by communicating with the PSP controller 12. The slate 34, with input by a worker 30, may communicate job status information 82 associated with the print job 32 and may receive workflow instructions 84 from the PSP controller 12. The workflow instructions 84 may allow the PSP controller 12 to dynamically update the workflow of the print job 32 when conditions on the PSP production floor 10 have changed. Thus, even if the workflow was recently changed by the PSP controller 12, the slate 34 at the print machine where the print job 32 is currently located may direct a worker to undertake the next workflow step (A) 104.

Figure 9:
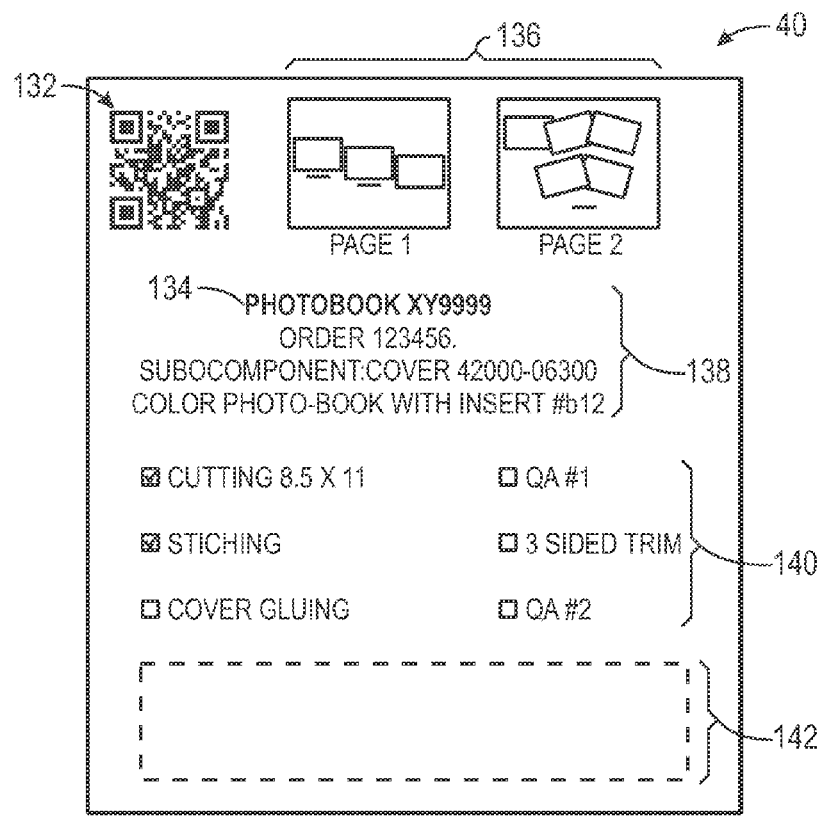
FIG. 9 is an illustration of a barcode-enabled paper job ticket associated with a print job, in accordance with an embodiment.

In a similar manner, a barcode-enabled paper job ticket 40, such as shown in FIG. 9, may allow a print job 32 to be tracked dynamically even if the workflow changes. In the example of the barcode-enabled paper job ticket 40 of FIG. 9, a barcode 132 includes a unique identifier that can be associated with the print job 32 (e.g., the barcode 132 may encode a JobID in the job definition format (JDF) standard). A descriptive name 134 below the barcode 132 may allow a worker 30 to find the print job 32 from among other print jobs 32. In addition, an image or series of images 136 may identify key parts of the print job 32, such as a first and last page of the completed print job 32, to allow a worker 30 to quickly identify the print job 32. The barcode-enabled paper job ticket 40 may additionally include a general description 138 of the print job 32, a list of related print jobs 32 or sub-jobs or components of the print job 32, a checklist 140 delineating major steps in the fulfillment path of the workflow of the print job 32, and a blank space 142 to allow the addition of handwritten information or another barcode during production, if desired.

This additional metadata appearing visually on the face of the barcode-enabled paper job ticket 40 may add a layer of safety to the otherwise generally digital-only nature of the tools used to track the print job 32. In the instance that a network connection 14 goes down, a worker 30 or the manager 28 may be able to know the identity and general steps of the workflow of the print job 32. Additionally, it may be appreciated that some workflow steps are simple enough and of sufficiently low risk that they may not involve a slate 34 and/or handheld device 36 (e.g., the stitching of the book block). For steps such as these, only a simple instruction may be placed on the barcode-enabled paper job ticket 40. Electronic job tracking may be carried out by a worker 30 using a handheld device 36, moving the print job 32 from one station to the next.

Figure 10:
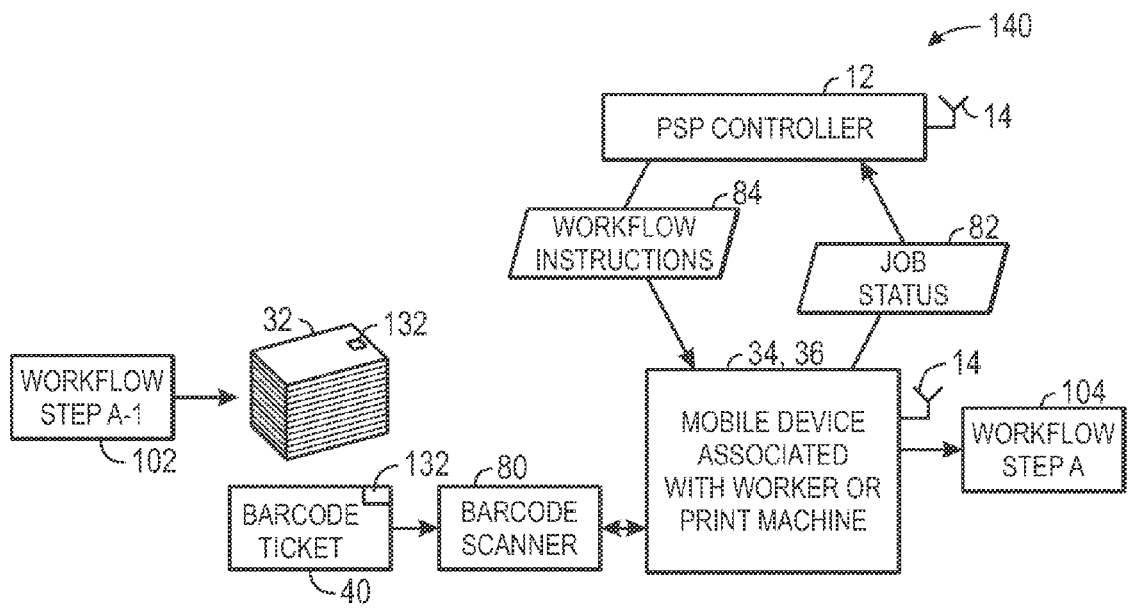
FIG. 10 is a flow diagram illustrating a manner of processing a print job using the barcode-enabled paper job ticket of FIG. 9 and a mobile device that has scanned the barcode, in accordance with an embodiment.

The barcode-enabled paper job ticket 40 may be used to track an associated print job 32, as illustrated by flow diagram 140 of FIG. 10. In the flow diagram 140 of FIG. 10, a print job 32 associated with a barcode-enabled paper job ticket 40 is shown to have completed a workflow step (A-1) 102. As can be seen in FIG. 10, the barcode-enabled paper job ticket is provided alongside the print job 32. Additionally or alternatively, the same barcode 132 may be printed in the margins of the print job 32. A worker 30 may scan one of these barcodes 132 using the camera 72 or a barcode scanner 80 coupled to a mobile device such as a slate 34 or a handheld device 36. Having retrieved the identity of the print job 32 via the barcode 132, the slate 34 and/or handheld device 36 may provide job status information 82 to the PSP controller 12. Additionally or alternatively, the slate 34 and/or handheld device 36 may receive workflow instructions 84 from the PSP controller 12 indicating, for example, that the print job 32 should undergo the next workflow step (A) 104. Because the slate 34 and/or handheld device 36 can receive the workflow instructions 84 in real-time, the print job 32 may undergo the proper workflow step (A) 104, even if the PSP controller 12 recently adjusted the workflow of the print job 32 in response to changing conditions on the PSP production floor 10.

As seen in FIGS. 5, 7, and 9, when a slate 34 and/or a handheld device 36 is "working with" a print job 32, the slate 34 and/or handheld device 36 may provide certain job status information 82 to the PSP controller 12. This job status information 82 may relate to steps currently taking place in the workflow of the print job 32 that may not otherwise be obtained by the PSP controller 12 (e.g., from a digitally connected print machine). For example, in a diagram 150 of FIG. 11, the job status information 82 generally may include routing information 152 and job status notification information 154. It should be appreciated that the job status information 82 shown in the diagram 150 is provided by way of example, and is not intended to be exhaustive. Rather, the diagram 150 is intended to present various types of job status information 82 that the PSP controller 12 may use to track the print job 32 as it progresses through the workflow. The job status information 82, as illustrated in the diagram 150, may be provided to the PSP controller 12 in job definition format (JDF) and/or job messaging format (JMF), or any other suitable format intelligible to the PSP controller 12.

Among the routing information 152 that may be conveyed in the job status information 82 may be, for example, an indication that the print job 32 has been picked up from a previous print machine ("Picked-Up") (block 156). That is, once a print job 32 has been processed by a first print machine (e.g., a printing press 16), and needs to be taken by a worker 30 to another print machine (e.g., a cutter 18) to continue in the workflow, a worker 30 may select a user-selectable representation displayed on the slate 34 and/or handheld device 36 that the print job 32 has been picked up. Thereafter, the PSP controller 12 may be able to track the time the worker 30 is carrying the print job 32 to the next print machine in the workflow and/or the time the print job 32 is buffered in a staging area. When the print job 32 has arrived at a next print machine where it is to be processed, the routing information 152 that may be sent in the job status information 82 to the PSP controller 12 may be an indication that the print job 32 is located at the next print machine ("At Device") (block 158). Once the print job 32 has been loaded into the print machine, the routing information 152 of the job status information 82 may be an identification that the print job 32 has been loaded onto the print machine ("Loaded") (block 160).

If, at some point, the print machine where the print job 32 is scheduled to be processed next in the workflow becomes unavailable, the routing information 152 may include, for example, identification that the print machine is no longer available ("Device Unavailable") (block 162). Moreover, other job status information 82 may be sent to the PSP controller 12 other than that particularly shown in the diagram 150 of FIG. 11. For example, the manager 28 and/or a worker 30 may actively send a request to the PSP controller 12 to change the status of a resource or print machine. By way of example, such a change in status may be to enable, disable, increase capacity, decrease capacity, change supplies, request maintenance, and so forth. Additionally or alternatively, a worker 30 may request a change in the workflow of the print job 32 or a set of print jobs 32. In such cases, the PSP controller 12 may ask clarifying questions and/or perform a validity check before proceeding.

Figure 11:
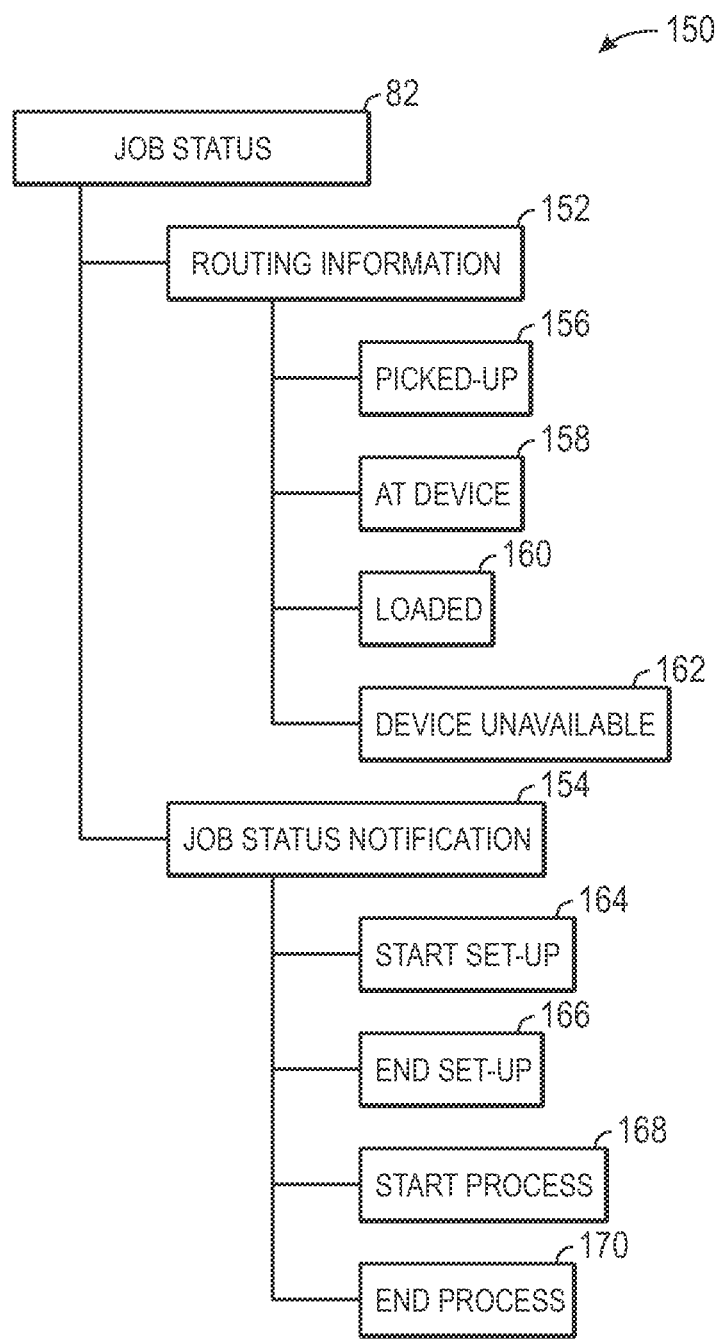
FIG. 11 is a schematic diagram representing various job status information that may be provided by a mobile device to a PSP controller to allow the PSP controller to track and/or dynamically control the workflow of a print job, in accordance with an embodiment.

When a print machine (e.g., the cutter 18B) is digitally connected to the PSP 112 and/or enabled to communicate using the job definition format (JDF) standard, most of the job status notification information 154 shown in FIG. 11 can be provided directly from that print machine. A non-digitally-connected print machine, however, may not directly communicate with the PSP controller 12. As such, the job status notification information 154 from the slate 34 and/or handheld device 36 that is working with the print job 32 when the print job 32 is processed by a non-digitally-connected print machine (e.g., the cutter 18A).

For example, the job status notification information 154 may include an indication that the set-up procedure to use a non-digitally-connected print machine (e.g., the cutter 18A) has begun ("Start Set-Up") (block 164). Additionally, the job status notification information 154 may include an indication that the set-up process has ended ("End Set-Up") (block 166). After the set-up process has ended, the job status notification information 154 that may be sent as job status information 82 to the PSP controller 12 may include an indication that the worker 30 has begun the main process of the print machine ("Start Process") (block 168). Additionally, the job status notification information 154 may also include an indication that this process has ended ("End Process") (block 170).

In the examples briefly noted above, the job status information 82 may be sent to the PSP controller 32 based on a selection of a user-selectable representation of the job status information 82 displayed on the slate 34 and/or handheld device 36. Additionally or alternatively, a slate 34 and/or handheld device 36 may automatically provide the job status information 82 discussed above to the PSP controller 12. For example, if the slate 34 and/or handheld device 36 is moved while serving as a real-time job ticket (RTJT) 90, its location may be tracked on or around the PSP production floor 10 (e.g., using a radio frequency identification (RFID) tag associated with the slate 34 and/or handheld device 36, GPS, electronic wireless beacons, and so forth). When the slate 34 and/or handheld device 36 begins to move from a print machine or arrives at a print machine, certain job status information 82 may be sent to the PSP controller 32. Similarly, reading an RFID badge 38 associated with the print job 32 and/or after scanning a barcode 132 of a barcode-enabled paper job ticket 40 associated with a print job 32 may identify the print job 32. At that time, the slate 34 and/or handheld device 36 that identified the print job 32 may send appropriate job status information 82 depending on which print machine and/or worker 30 the slate and/or handheld device 36 is assigned to.

Figure 12:
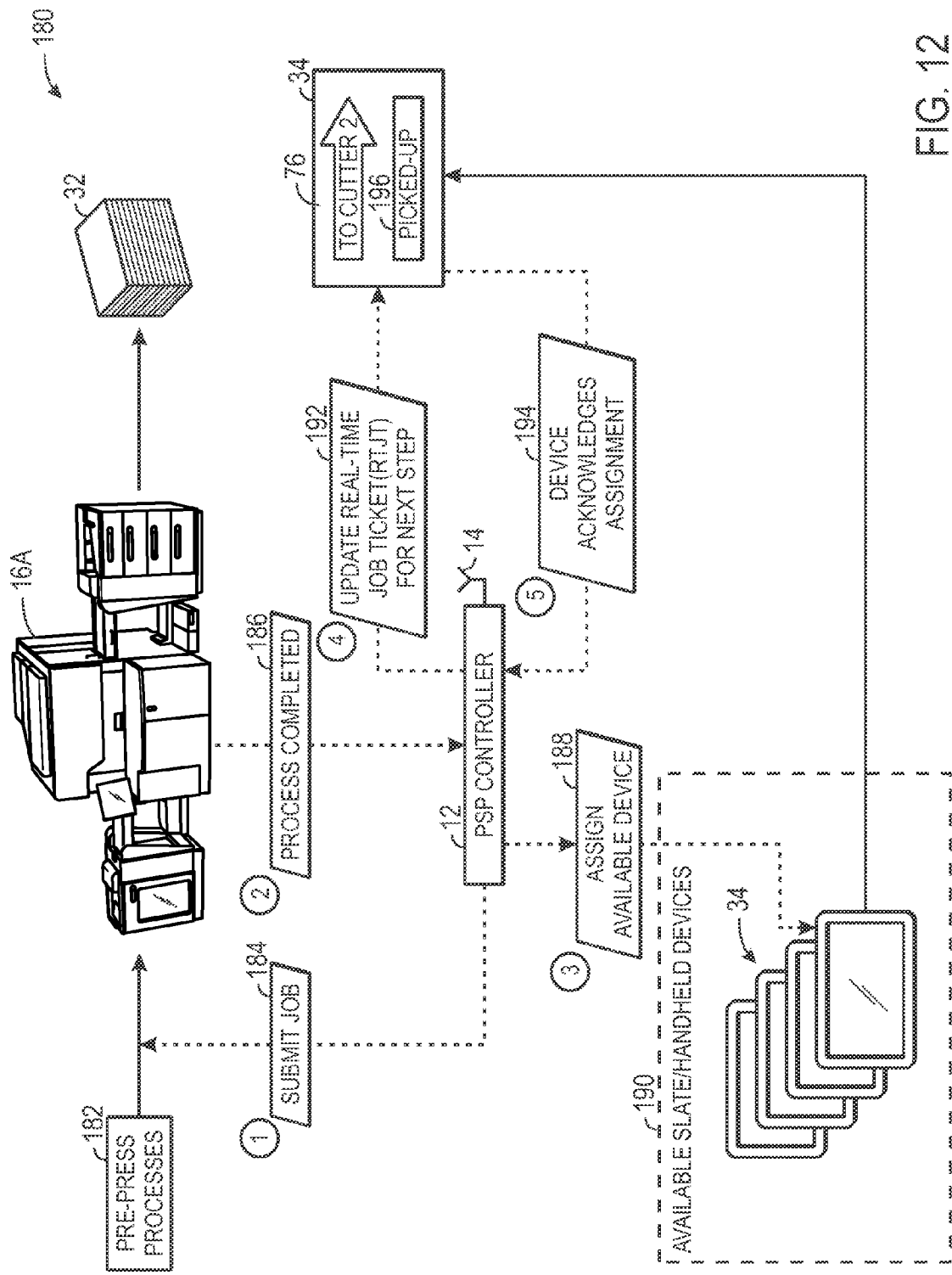
FIGS. 12-14 describe various manners in which a print job may be initially associated with a mobile device serving as a real-time job ticket (RTJT), an RFID badge, and/or a barcode-enabled paper job ticket, in accordance with embodiments.
Figure 13:
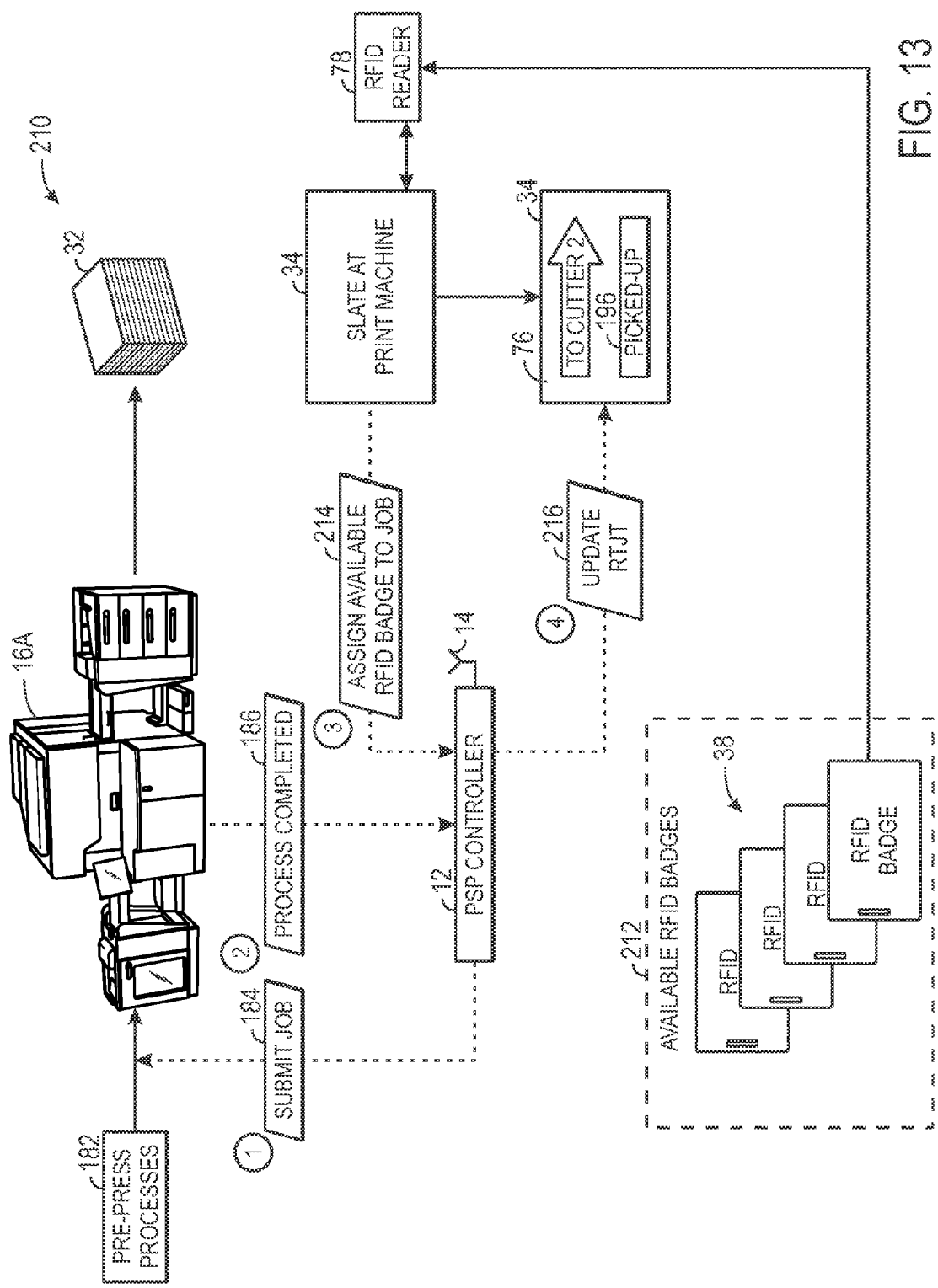
Figure 14:
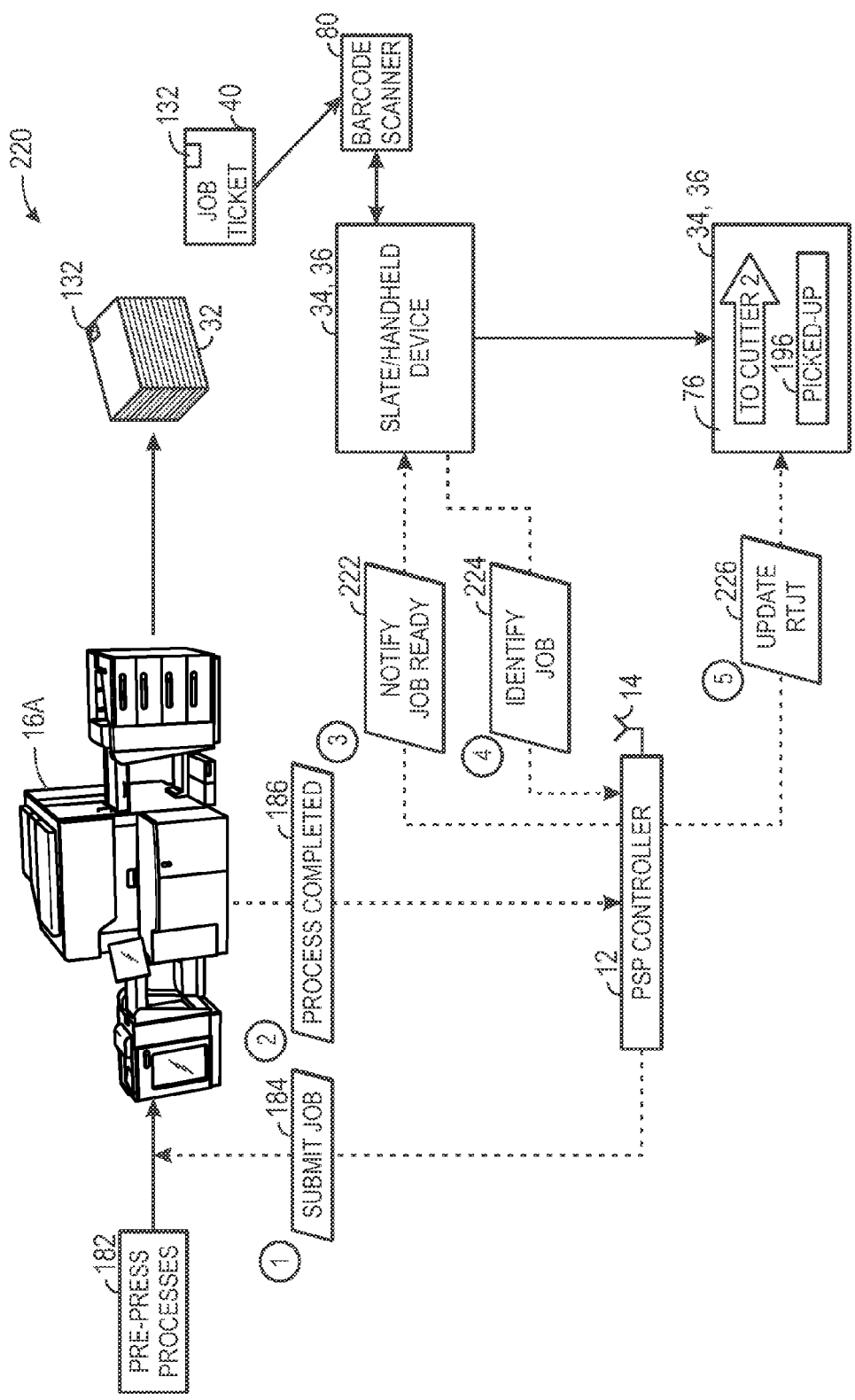

FIGS. 12-14 are flow diagrams that respectively describe various ways in which a slate 34 and/or handheld device 36 may be assigned to a print job 32 to operate as a real-time job ticket (RTJT) 90, an RFID badge 38 may be assigned to a print job 32, and/or a barcode-enabled paper job ticket 40 may be assigned to a print job 32. For example, in a flow diagram 180 shown in FIG. 12, pre-press processes 182 may prepare a print job 32 to be printed on, for example, the printing press 16A. The PSP controller 12 may submit the job (block 184) to the printing press 16A in digital format. When the printing press 16A provides a notification that the print job 32 has been completed (block 186), the PSP controller 12 may assign an available slate 34 and/or handheld device 36 (block 188) to serve as a real-time job ticket (RTJT) 90. Thus, a worker 30 may pick up the assigned slate 34 and place it alongside a print job 32.

The PSP controller 12 may provide workflow instructions 84 that update the RTJT to indicate the next step in the workflow (block 192). Thus, as illustrated in FIG. 12, the display 76 of the slate 34 provides a representation of the workflow instructions 84 indicating that the print job 32 should be taken to the cutter 18B. The slate 34 also may acknowledge the assignment (block 194) to the print job 32. A user-selectable representation 196 of the job status information 182, ("Picked-Up") (block 156) of the diagram 156 is shown at numeral 196. A worker 30 may select the user-selectable representation 196 to indicate that the print job 32 has been picked up from the printer 16A, and therefore is en route to the next step of the workflow (e.g., is being carried to the cutter 18B).

A flow diagram 210 of FIG. 13 relates to the assignment of a radio frequency identification (RFID) badge 38 to a newly printed print job 32. The flow diagram 210 of FIG. 13 may begin with the pre-press processes 182 and the submission of the job (block 184) to a printing press (e.g., the printing press 16A). After the print job 32 has been printed, the printing press 16A may indicate as such (block 186) to the PSP controller 12. An RFID badge 38 next may be assigned to the print job 32. A worker 30 may scan an available (i.e., unassigned) RFID badge 38 using an RFID reader 78 associated with, for example, a slate 34. The slate 34 may provide an indication of a unique identifier from an RFID chip 110 in the RFID badge 38 (block 214) to the PSP controller 12, which may associate at unique identifier with a job identification number of the print job 32. Alternatively, the slate 34 may receive a JobID from the PSP controller 12 and may program the JobID onto the RFID badge 38. The PSP controller 12 additionally may update a real-time job ticket (RTJT) associated with the print job 32, which may be displayed on the slate 34 at the print machine. Thus, in the example of FIG. 13, the display 76 of the slate 34 may display a representation of the workflow instructions 84 directing a worker 30 to bring the print job 32 to the cutter 18B. Additionally, in the example of FIG. 13, the display 76 of the slate 34 shows a user-selectable representation of block 156 of the job status information 82 ("Picked-Up").

A flow diagram 220 of FIG. 14 represents a manner in which a barcode-enabled paper job ticket 40 may be assigned to a print job 32. As in the examples of FIGS. 12 and 13, discussed above, the flow diagram 220 may begin with pre-press processes 182 and the submission of the job (block 184) to a printing press 16 (e.g., the printing press 16A). When the print job 32 has been printed by the printing press 16, the printing press 16 may provide an indication as such (block 186). In printing the print job 32, the printing press 16 may also print a barcode-enabled paper job ticket 40. Furthermore, if desired, the same barcode 132 that appears on the barcode-enabled paper job ticket 40 may also be printed in the margins of the print job 32. As will be discussed below, the print job 32 can sometimes represent a ganged print job combining several sub-jobs. In such instances, the margins around each of the sub-jobs may have different barcodes 132 that can be used after the ganged print job 32 is cut into its constituent sub-jobs.

A slate 34 and/or handheld device 36 associated with the printing press 16 and/or a worker 30 may begin "working with" the print job 32. For example, a worker 30 in the vicinity may be alerted that the print job 32 is ready to be picked up by the PSP controller 12. For example, the PSP controller 12 may issue a notification (block 222) to a handheld device 36 belonging to a worker 30 or to a slate 34 located at the printing press (e.g., the printing press 16A). By scanning the barcode 132, the slate 34 and/or handheld device 36 may provide information identifying the print job 32 (block 224). The PSP controller 12 may also update a real-time job ticket (RTJT) associated with the print job 32 (block 226), allowing the slate 34 and/or handheld device 36 to indicate on its display 76 the next step in the workflow of the print job 32 (e.g., to be taken to the cutter 18B). The slate 34 and/or handheld device 36 also may display a user-selectable representation of the job status information 82 of block 156 of FIG. 11 ("Picked-Up"). Selecting the user-selectable representation 196 may allow a worker 30 to indicate that the print job 32 has been picked up and is en route to the next step in the workflow.

Once a print job 32 has been associated with a slate 34 and/or handheld device 36 to operate as a real-time job ticket (RTJT) (FIG. 12), or associated with an RFID badge 38 (FIG. 13), and/or associated with a barcode-enabled paper job ticket 40 (FIG. 14), the print job 32 may progress through its workflow as determined by the PSP controller 12. In any of these situations, FIGS. 15-18 represent examples by which the electronic devices currently "working with" the print job 32 (e.g., a slate 34 assigned to the print job 32 to operate as a real-time job ticket (RTJT), a slate 34 that has scanned an RFID badge 38 associated with the print job 32, and/or a slate 34 that has scanned a barcode-enabled paper job ticket 40 associated with a print job 32) can communicate with the PSP controller 12 to send job status information 82 and receive workflow instructions 84 about the print job 32.

Figure 15:
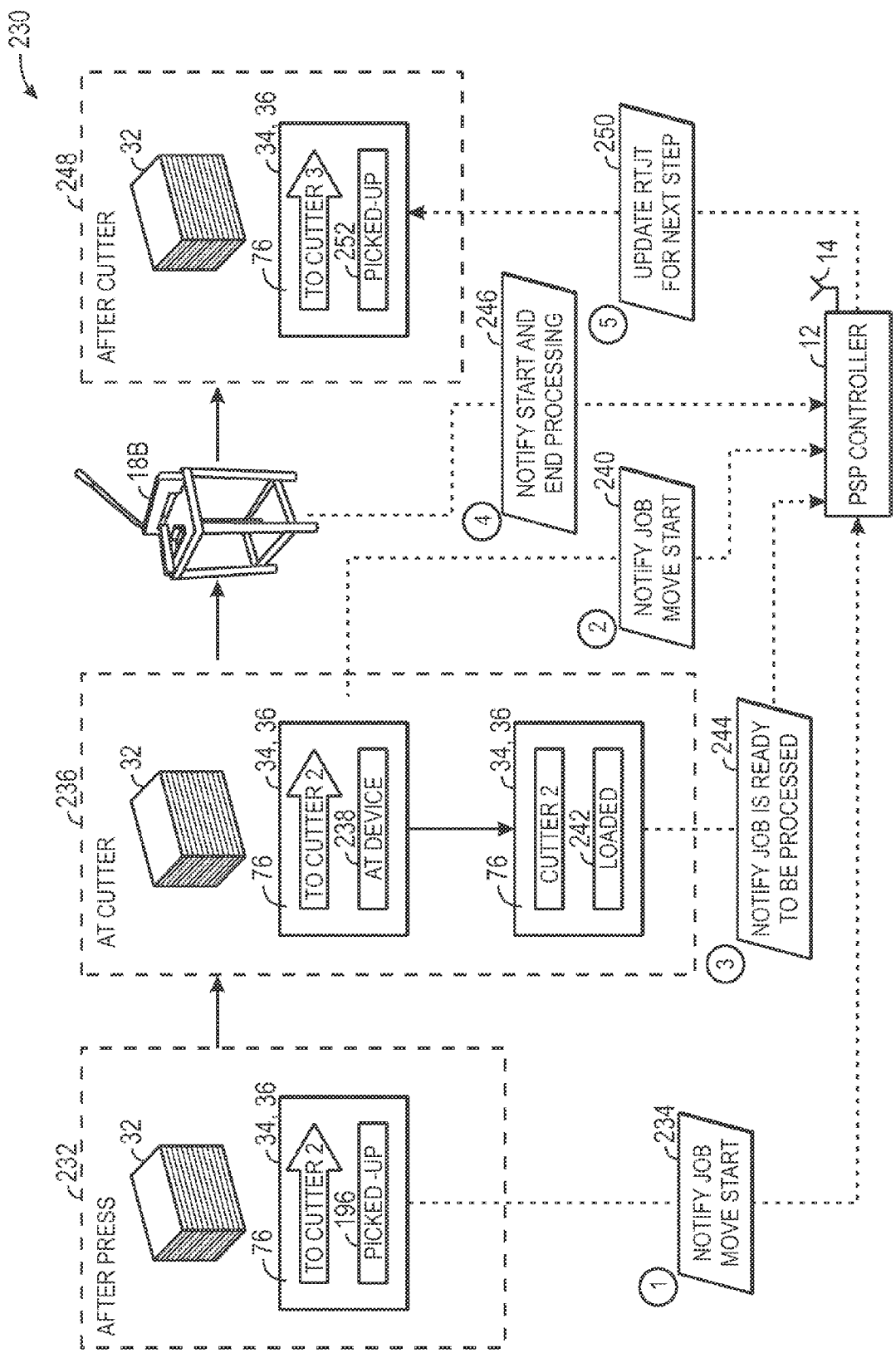
FIG. 15 is a flow diagram illustrating a manner of processing a print job associated with a mobile device serving as a real-time job ticket (RTJT), an RFID badge, and/or a barcode-enabled paper job ticket through a digitally connected print machine, in accordance with an embodiment.
Figure 16:
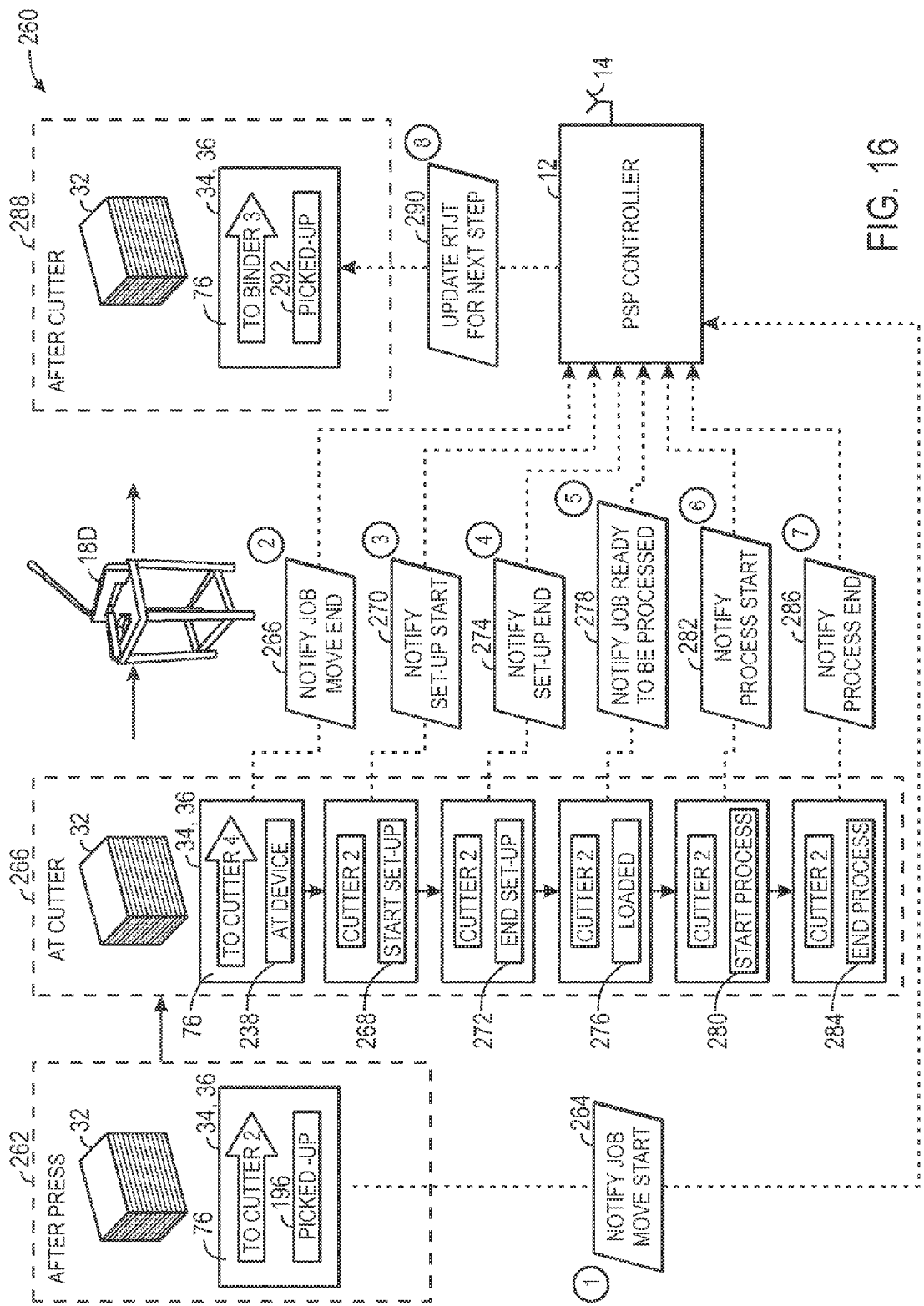
FIG. 16 is a flow diagram illustrating a manner of processing a print job associated with a mobile device serving as a real-time job ticket (RTJT), an RFID badge, and/or a barcode-enabled paper job ticket using a non-digitally-connected print machine, in accordance with an embodiment.
Figure 17:
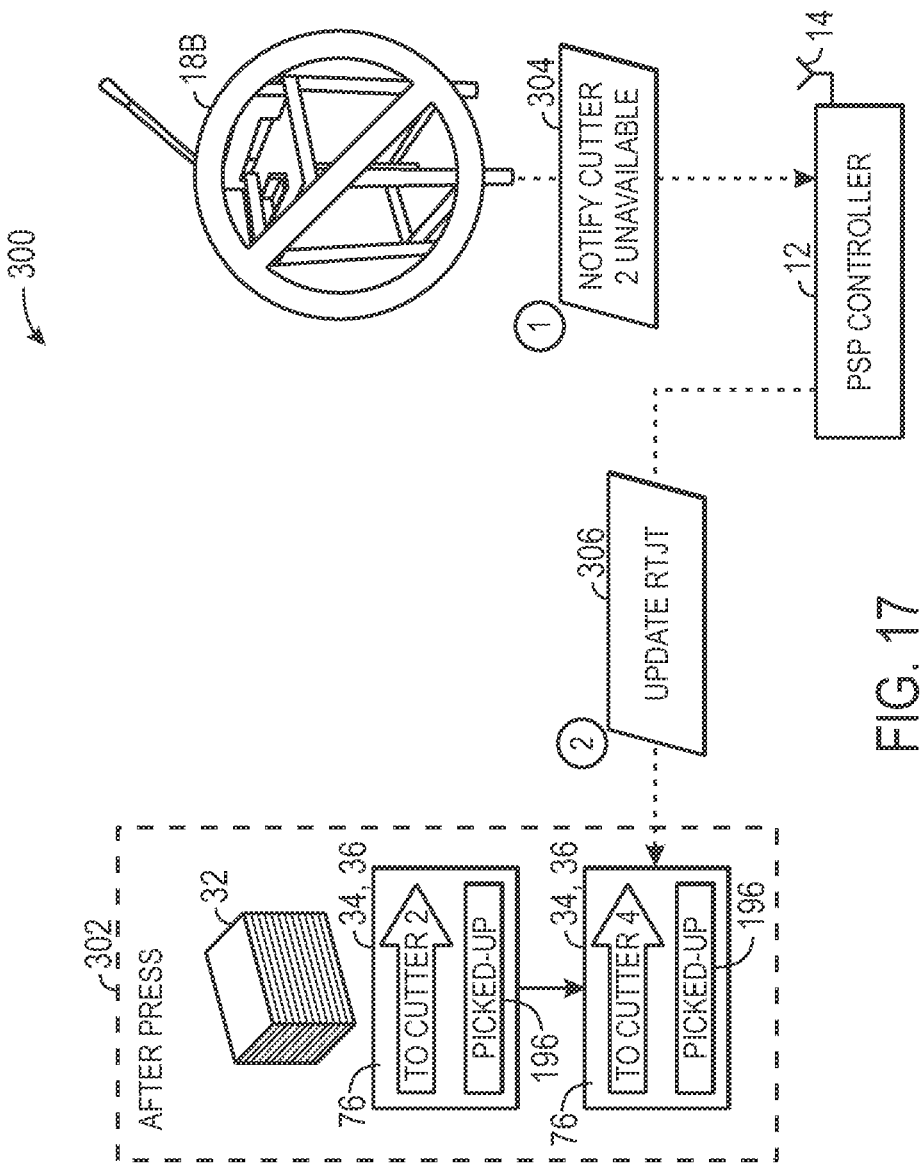
FIG. 17 is a flow diagram illustrating a manner in which a digitally-connected print machine can notify a PSP controller when the print machine becomes unavailable, allowing the PSP controller to update a print job workflow and alert workers of the update, in accordance with an embodiment.
Figure 18:
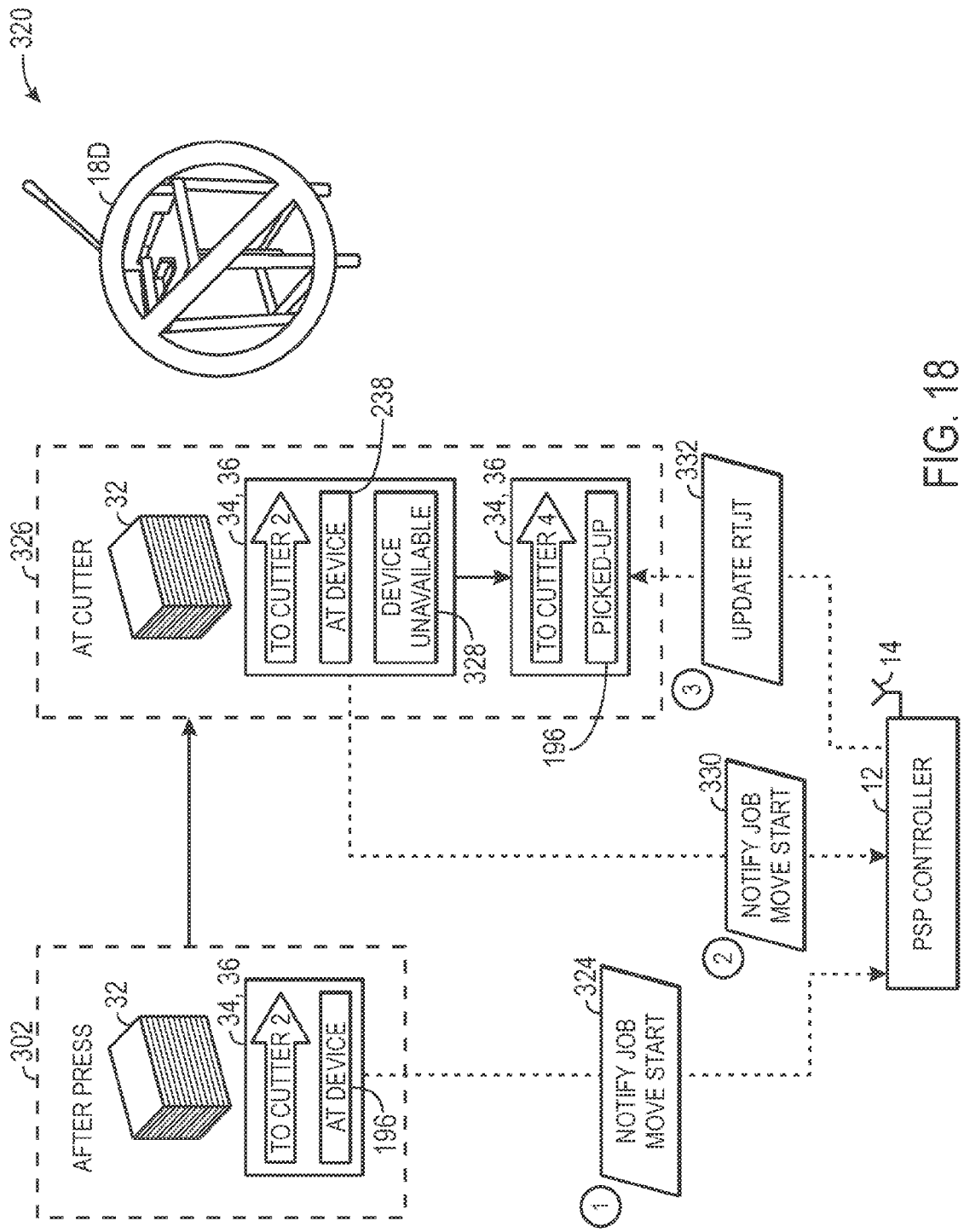
FIG. 18 is a flow diagram illustrating a manner in which a worker may indicate that a print machine has become unavailable using a mobile device, allowing a PSP controller to update the workflow of a print job and alert a worker of this update, in accordance with an embodiment.

Specifically, FIG. 15 relates an example by which the PSP controller 12 may track a print job 32 through processing by a digitally-connected print machine and FIG. 16 relates an example by which the PSP controller 12 can track the print job 32 through processing by a non-digitally-connected print machine. FIGS. 17 and 18 show ways in which the PSP controller 12 may accurately reroute a print job 32 scheduled to be processed by a digitally-connected print machine or a non-digitally-connected print machine, respectively, that subsequently becomes unavailable.

In the example of FIG. 15, a flow diagram 230 begins after a print job 32 has been printed by a printing press 16, as indicated by numeral 232. As such, a slate 34 and/or handheld device 36 is shown to be "working with" the print job 32 may display a representation of the workflow instructions 84 last received from the PSP controller 12. That is, the slate 34 and/or handheld device 36 pictured at block 232 may be understood as assigned to the print job 32 to operate as a real-time job ticket (RTJT) and/or to have scanned an RFID badge 38 or a barcode-enabled paper job ticket 40 associated with the print job 32. In the example of FIG. 15, the display 76 of the slate 34 and/or handheld device 36 displays an indication of the most recent workflow instructions 84 received from the PSP controller 12. Thus, the display 76 indicates that the print job 32 should be taken to the cutter 18B. Additionally, the user-selectable representation 196 of the job status information 82 of block 156 of FIG. 11 ("Picked-Up") may be selected by a worker. In response, the slate 34 and/or handheld device 36 may notify the PSP controller 12 that the print job 32 is being moved (block 234).

The worker 30 may arrive with the print job 32 at the next step in the workflow, at the cutter 18B (block 256), which is shown to be a digitally connected print machine. Here, a slate 34 and/or handheld device 36 is shown to be "working with" the print job 32 at the site of its next workflow process step. That is, the slate 34 and/or handheld device 36 pictured at block 232 may be understood as to be the same slate 34 and/or handheld device 36 assigned to the print job 32 to operate as a real-time job ticket (RTJT) or may be the same or a new slate 34 and/or handheld device 36 that has scanned an RFID badge 38 or a barcode-enabled paper job ticket 40 associated with the print job 32. Thus, for example, if the slate 34 and/or handheld device 36 is not assigned to the print job 32 to operate as a real-time job ticket (RTJT), the slate 34 and/or handheld device 36 may be a slate 34 that is permanently located at the cutter 18B or that has been assigned to the cutter 18B for the shift or day.

In the particular example seen at block 256 of FIG. 15, the display 76 of the slate 34 and/or handheld device 36 may continue to indicate that the next step in the workflow is to take the print job 32 to the cutter 18B until the worker 30 selects a user-selectable representation 238 of the job status information 82 of block 158 of FIG. 11 ("At Device"). When the worker 30 selects the user-selectable representation 238, the slate 34 and/or handheld device 36 may provide a notification that the print job 32 has arrived at the next print machine (e.g., the cutter 18B) (block 240). Alternatively, the notification of block 240 may be sent automatically by the slate 34 and/or handheld device 36 when an RFID badge 38 or a barcode-enabled paper job ticket 40 associated with the print job 32 is scanned upon arrival at the print machine.

Thereafter, the slate 34 and/or handheld device 36 may display a representation of the workflow instructions 84 indicating that the print job 32 is at the cutter 18B. Additionally, a user-selectable representation 242 of the job status information 82 of block 160 of FIG. 11 ("Loaded") may be selected by a worker 30 to notify the PSP controller 12 that the print job 32 has been loaded and is loaded into the cutter 18B (block 244), and is ready to be processed.

The digitally connected cutter 18B may provide a notification to the PSP controller 12 when processing starts and ends (block 246). When the print job 32 has been processed by the cutter 18B, as generally represented by block 248, the PSP controller 12 may update the real-time job ticket (RTJT) associated with the print job 32 to indicate the next step in the workflow (block 250). Thus, the slate 34 and/or handheld device 36 that is currently "working with" the print job 32 may display an indication of the workflow instructions 84, here noting that the print job 32 should be taken next to the binder 20C. In addition, the slate 34 and/or handheld device 36 may display a user-selectable representation 252 of the job status information 82 of block 156 ("Picked-Up"). When the user-selectable representation 252 is selected, the slate 34 and/or handheld device 36 may indicate to the PSP controller 12 that the print job 32 is being taken by a worker 30 to the next step in the workflow.

Even when a print machine is non-digitally-connected, the PSP controller 12 may continue to track the status of a print job 32 using the mobile device or devices currently "working with" the print job 32 (e.g., a slate 34 assigned to the print job 32 to operate as a real-time job ticket (RTJT), a slate 34 located at a print machine that has scanned an RFID badge 38 associated with the print job 32, and/or a slate 34 and/or handheld device 36 that has scanned a barcode-enabled paper job ticket 40 associated with the print job 32). In one example shown in a flowchart 260 of FIG. 16, a non-digitally-connected print machine, the cutter 18D, may be used to process a print job 32. Although the cutter 18D is not digitally connected to the PSP controller 12, the PSP controller 12 still may be kept apprised of the print job 32 status.

The flow diagram 260 may begin when a print job 32 is located at a printing press 16 after printing has taken place, as illustrated at block 262. Here, a slate 34 and/or handheld device 36 is shown to be "working with" the print job 32 at the site of its next workflow process step. That is, the slate 34 and/or handheld device 36 pictured at block 262 may be understood as assigned to the print job 32 to operate as a real-time job ticket (RTJT) and/or to have scanned an RFID badge 38 or a barcode-enabled paper job ticket 40 associated with the print job 32. In the example of FIG. 16, the slate 34 and/or handheld device 36 that is "working with" the print job 32 at the location of block 262 is displaying an indication that the print job 32 should be taken to the cutter 18D. Additionally, the display 76 may display a user-selectable representation of the job status information 82, particularly the job status information 82 of block 156 of FIG. 11 ("Picked-Up").

By way of example, when a worker 30 selects the user-selectable representation 196, the slate 34 and/or handheld device 36 may notify the PSP controller 12 that the print job 32 is being moved (block 264). The print job 32 then may arrive at the next print machine specified by the workflow instructions 84. In the example of FIG. 16, the print job 32 has been taken to the non-digitally-connected cutter 18D. There, a series of events may take place while the print job 32 is at the cutter 18D, as generally represented by block 266. Before continuing further, it may be appreciated that the slate 34 and/or handheld device 36 pictured at block 266 may be understood as to be "working with" the print job 32. That is, the slate 34 and/or handheld device 36 at block 266 may be the same slate 34 and/or handheld device 36 assigned to the print job 32 to operate as a real-time job ticket (RTJT) or may be the same or a new slate 34 and/or handheld device 36 that has scanned an RFID badge 38 or a barcode-enabled paper job ticket 40 associated with the print job 32. Thus, for example, if the slate 34 and/or handheld device 36 is not one that is assigned to the print job 32 to operate as a real-time job ticket (RTJT), the slate 34 and/or handheld device 36 may be a slate 34 that is permanently located at the cutter 18D or that has been assigned to the cutter 18D for the day.

Since the non-digitally-connected cutter 18D cannot communicate directly with the PSP controller 12, the PSP controller 12 may kept apprised the status of the print job 32 by receiving job status information 82 from the slate 34 and/or handheld device 36. In particular, the slate 34 and/or handheld device 36 may display the user-selectable representation 238 of the job status information 82 of block 158 of FIG. 11 ("At Device"). Selecting the user-selectable representation 238 may cause the slate 34 and/or handheld device 36 to notify that the movement of the print job 32 has ended (block 266). Next, when the worker 30 begins to start the set-up process at the cutter 18D, the worker 30 may select a user-selectable representation 286 of the job status information 82 of block 164 of FIG. 11 ("Start Set-Up"). Doing so may cause the slate 34 and/or handheld device 36 to notify the PSP controller 12 that the startup procedure has begun (block 270). When the worker 30 has finished the set-up procedure, the worker 30 may select a user-selectable representation 272 of the job status information 82 of block 166 of FIG. 11 ("End Set-Up"). As a result, the slate 34 and/or handheld device 36 may notify that the set-up procedure has ended (block 274). When the print job 32 has been loaded into the cutter 18D, a worker 30 may select a user-selectable representation 276 of the job status information 82 of block 160 of FIG. 11 ("Loaded"), causing the slate 34 and/or handheld device 36 to notify the PSP controller 12 that the print job 32 is ready to be processed at the cutter 18D (block 278).

Since the cutter 18D is non-digitally-connected and cannot otherwise communicate with the PSP controller 12, the worker 30 may select a user-selectable representation 280 of the job status information 82 of block 186 ("Start Process"), signaling that the current process in the workflow has begun (block 282). When finished, the worker 30 may select a user-selectable representation 284 of the job status information 82 of block 170 of FIG. 11 ("End Process"). The slate 34 and/or handheld device 36 thereafter may notify the PSP controller 12 that the process has ended (block 286).

Having been processed by the cutter 18D, the print job 32 may be at a stage immediately afterward, as generally indicated by block 288. The PSP controller 12 may update the real-time job ticket (RTJT) associated with the print job 32 on the electronic device currently working with the print job 32 (block 290). Thus, in the example of FIG. 16, the slate 34 and/or handheld device 36 now "working with" the print job 32 may display an representation of the workflow instructions 84 indicating the print machine (e.g., the binder 20C) where the print job 32 should be taken next. As also shown in the example of FIG. 16, the slate 34 and/or handheld device 36 is displaying a user-selectable representation of the job status information 82 of block 176 of FIG. 11 ("Picked-Up"). When a worker 30 selects the user-selectable representation 292, the slate 34 and/or handheld device 36 may notify the PSP controller 12 that the print job 32 has been picked up from the cutter 18D.

In some cases, a print machine may unexpectedly become unavailable. When the PSP controller 12 can dynamically update the workflows associated with the print jobs 32 (e.g., a real-time job ticket (RTJT)), a print job 32 scheduled to be processed by an unavailable print machine can be rerouted to another print machine. According to the present disclosure, the PSP controller 12 may accurately reroute a print job 32 regardless of whether the print job 32 was scheduled to be processed by a digitally-connected print machine or a non-digitally-connected print machine, as respectively illustrated by examples shown in FIG. 17 and FIG. 18.

In particular, a flow diagram 300 of FIG. 17 illustrates a manner in which the PSP controller 12 may reroute a print job 32 scheduled to be processed by a digitally-connected print machine (e.g., the cutter 18B) that becomes unavailable. The flow diagram 300 may begin when the print job 32 has been printed by a printing press 16, as generally indicated by block 302. In the example of FIG. 17, a slate 34 and/or handheld device 36 is understood to be working with the print job 32. In other words, the slate 34 and/or handheld device 36 pictured at block 302 may be understood as assigned to the print job 32 to operate as a real-time job ticket (RTJT) and/or to have scanned an RFID badge 38 or a barcode-enabled paper job ticket 40 associated with the print job 32.

When the print job 32 initially is printed at the printing press 16, the slate 34 and/or handheld device 36 may provide an indication of the workflow instructions 84 from the PSP controller 12. In the flow diagram 300 of FIG. 17, the representation of the workflow instructions 84 state that the print job 32 should next be taken to the cutter 18B. In this case, however, the cutter 18B has suddenly become unavailable. Thus, the cutter 18B may notify the PSP controller 12 that it is no longer available (block 304). In response, the PSP controller 12 may determine new workflows for at least the print jobs 32 that were scheduled to be processed by the cutter 18B. The PSP controller 12 then may update the real-time job ticket (RTJT) associated with the print job 32 illustrated at block 302 (block 306). Now, when the slate 34 and/or handheld device 36 displays an indication of the workflow instructions 84, the slate 34 and/or handheld device 36 indicates that the print job 32 should be taken to the cutter 18D instead of the cutter 18B.

As mentioned above, according to the present disclosure, the PSP controller 12 may remain apprised of the status of the print machines of the PSP production floor 10 even if the print machines are non-digitally-connected (e.g., unable to directly communicate using the job definition format (JDF) or job messaging format (JMF) standards). For example, as shown by a flow diagram of 320 of FIG. 18, an electronic device working with a print job 32 may communicate to the PSP controller 12 when a non-digitally-connected print machine becomes unavailable. In the flow diagram 320 of FIG. 18, the print job 32 begins after printing at a printing press 16, as generally represented by a block 322. A slate 34 and/or handheld device 36 is "working with" the print job 32 at block 322. In other words, the slate 34 and/or handheld device 36 pictured at block 322 may be understood as assigned to the print job 32 to operate as a real-time job ticket (RTJT) and/or to have scanned an RFID badge 38 or a barcode-enabled paper job ticket 40 associated with the print job 32.

In the example of FIG. 18, the slate 34 and/or handheld device 36 at block 322 is displaying an indication of the workflow instructions 84 from the PSP controller 12. These workflow instructions 84 direct the worker 30 to bring the print job 32 to the cutter 18D. A user-selectable representation 196 of the job status information 82 of block 156 of FIG. 11 ("Picked-Up") can be selected by a worker 30 to notify the PSP controller 12 that the print job 32 is being moved to the cutter 18D (block 324). The print job 32 may arrive at the next print machine where it is to be processed (e.g., cutter 18D), as generally represented by block 326. At the location of block 326, a slate 34 and/or handheld device 36 is shown to be "working with" the print job 32 at block 322. The slate 34 and/or handheld device 36 pictured at block 322 may be understood as assigned to the print job 32 to operate as a real-time job ticket (RTJT) and/or to have scanned an RFID badge 38 or a barcode-enabled paper job ticket 40 associated with the print job 32.

Though the PSP controller 12 originally provided workflow instructions 84 indicating the print job 32 should be taken to the cutter 18D, the cutter 18D has since become unavailable. For example, the cutter 18D, being non-digitally-connected, may not have communicated with the PSP controller 12. As such, the PSP controller 12 may not have become aware that the cutter 18D is unavailable to update the print job 32 workflow.

Instead, a worker 30 may select a user-selectable representation 328 of the job status information 82 of block 162 of FIG. 11 ("Device Unavailable"). Doing so may cause the slate 34 and/or handheld device 36 to notify the PSP controller 12 that the cutter 18D has become unavailable (block 330). The PSP controller 12 then may determine new workflows for at least the print jobs 32 scheduled to be processed by the cutter 18D. Thus, the PSP controller 12 may communicate an update to the real-time job ticket (RTJT) associated with the print job 32 (block 332). As a result, the slate 34 and/or handheld device 36 working with the print job 32 may provide a new representation of the workflow instructions 84 from the PSP controller 12. For instance, the slate 34 and/or handheld device 36 may display an indication that the print job 32 should be taken to the cutter 18A. Additionally, the slate 34 and/or handheld device 36 may display a user-selectable representation 196 of the job status information 82 of block 156 of FIG. 11 ("Picked-Up"). When the user-selectable representation 196 is selected, the slate 34 and/or handheld device 36 may notify the PSP controller 12 that the print job 32 is being moved to the cutter 18A.

The various embodiments of the present disclosure may also allow ganged print jobs 32 to more easily be split and tracked toward completion on the PSP production floor 10. A flow diagram 340 of FIG. 19 particularly illustrates one manner in which slates 34 and/or handheld devices 36 may be assigned to a ganged print job 32 and split into constitute sub-jobs 32A, 32B, and 32C.

A ganged print job is a print job where multiple sub-jobs have been printed on the same sheets of paper. Although printing multiple sub-jobs on the same paper may allow for the most efficient manner of printing the various sub-jobs, these sub-jobs may be difficult to track according to conventional methods. Accordingly, as generally illustrated by the flow diagram 340, a ganged print job 32, having multiple sub-jobs 32A, 32B, and 32C printed on its pages may be separated into its constitute sub-jobs 32A, 32B, and 32C after being processed by a cutter 18 (e.g., the cutter 18B). in the example of FIG. 19, the ganged job 32 has a slate 34A assigned to it to operate as a real-time job ticket (RTJT), and has followed the ganged print job 32 through its workflow to the point reaching the cutter 18B. The cutter 18B may cut the ganged print job 32 into constitute sub-jobs 32A, 32B, and 32C. By way of example, the slate 34A may remain assigned only to the constituent sub-job 32A.

The PSP controller 12 thus may assign other slates 34 to operate as real-time job tickets (RTJTs) to the sub-jobs 32B and 32C. However, in alternative embodiments, all three of the sub-jobs 32A, 32B, and 32C may be assigned new slates 34 and/or handheld devices 36. In one example, the cutter 18B may indicate to the PSP controller 12 that it has completed the job of cutting the ganged job 32 (block 342). The PSP controller 12 then may assign certain available slates 34 and/or handheld devices 36 to the (block 344) to operate as real-time job tickets (RTJTs) associated with the sub-jobs 32B and 32C. A worker 30 may take the newly assigned slates 34B and 34C to their respective sub-jobs 32B and 32C. The PSP controller 12 also may update the real-time job tickets (RTJTs) associated with the sub-job 32A (block 346), the sub-job 32B (block 348), and the sub-job 32C (block 350). The newly assigned slates 34B and 34C may acknowledge their assignments, as respectively illustrated by blocks 352 and 354. Thereafter, the slates 34A, 34B, and 34C may follow their respective sub-jobs 32A, 32B, and 32C as they progress to completion on the PSP production floor 10.

Figure 19:
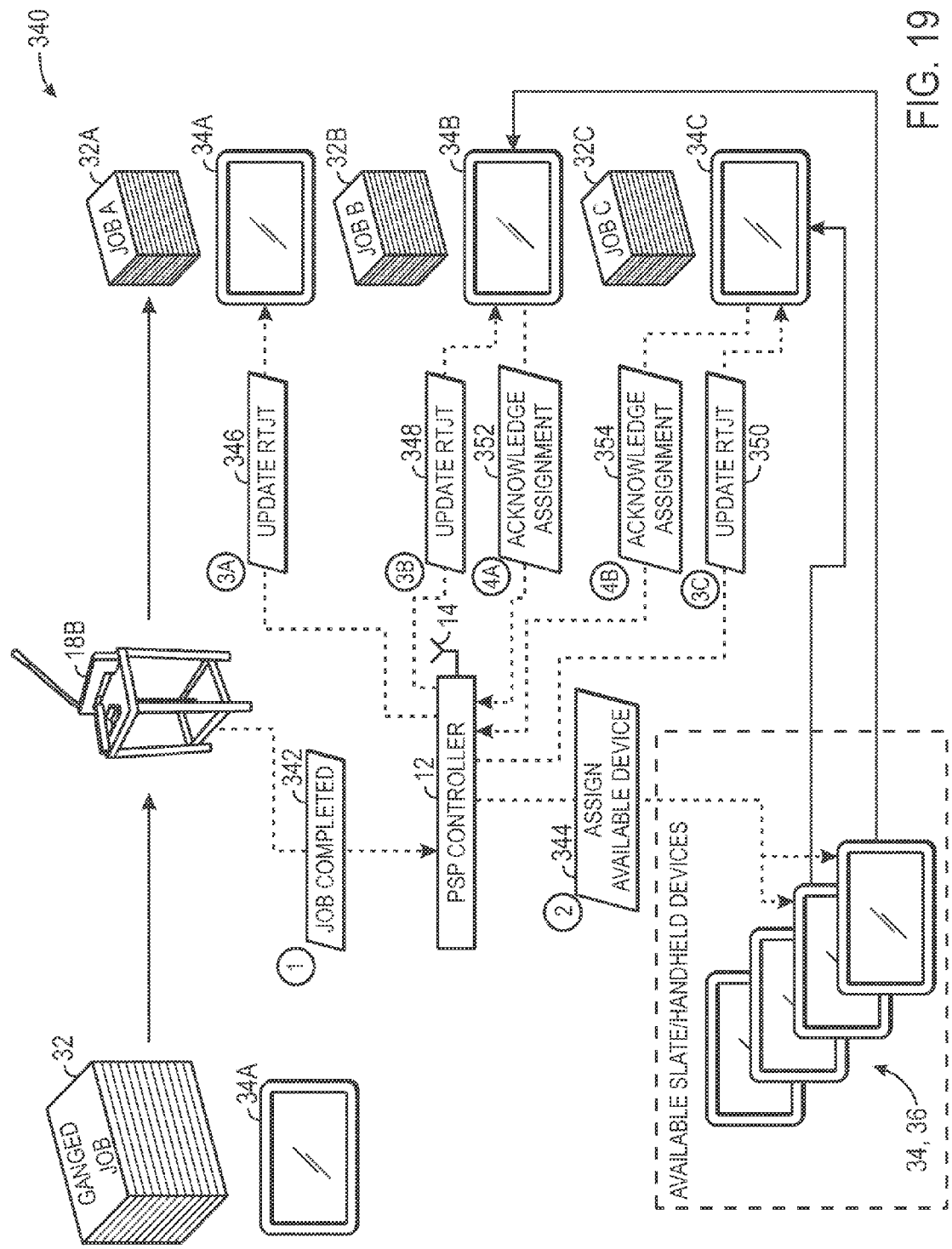
FIG. 19 is a flow diagram illustrating a manner of dividing a ganged job into constituent sub-jobs using mobile devices as real-time job tickets (RTJTs), RFID badges, and/or barcode-enabled paper job tickets, in accordance with an embodiment.

The flow diagram 340 of FIG. 19 specifically used the example of assigning slates 34 on-the-fly to operate as real-time job tickets (RTJTs). However, it should be understood that, additionally or alternatively, sub-jobs of a ganged print job 32 may be assigned new, separate radio frequency identification (RFID) badges 38 and/or barcode-enabled paper job tickets 40. For example, when sub-jobs 32A, 32B, and 32C are cut from a ganged print job 32, the sub-jobs 32B and 32C may be assigned new RFID badges 38. Additionally or alternatively, when sub-jobs 32A, 32B, and 32C are cut from a ganged print job 32, the sub-jobs 32B and 32C may be assigned new barcode-enabled paper job tickets 40 that have been printed for this purpose. In some cases, the newly assigned barcode-enabled paper job tickets 40 may have a barcodes 132 that matched corresponding barcodes 132 printed on the margins of the sub-jobs 32B and 32C.

In another particular example, the various sub-jobs of a ganged print job 32 assigned with a barcode-enabled paper job ticket 40 may initially have unique JobIDs that are all linked together. After cutting the ganged print job 32 into sub-jobs (e.g., the sub-jobs 32A, 32B, and 32C), the respective JobIDs of the sub-jobs may be de-linked. The different sub-jobs (e.g., 32A, 32B, and 32C) may be placed into different bins based on the workflow instructions 84 associated with each.

From this point, for example, a worker 30 may be notified on a handheld device 36 to find the JobID of a specified sub-job 32A. When the barcode-enabled paper job ticket 40 associated with the sub-job 32A is scanned, the PSP controller 12 may provide workflow instructions 84 directing the worker 30 to bring the sub-job 32A to, for example, the binder 18B. Each of the sub-jobs 32B and 32C also may be brought to the binder 18B to be bound. After being bound, the sub-jobs 32A, 32B, and 32C may be placed in an output bin (e.g., the binning area 22). Other workers 30 may retrieve the sub-jobs 32A, 32B, and 32C from the output bin, scanning their JobIDs from their respective barcode-enabled paper job tickets 40. The PSP controller 12 may send workflow instructions 84 requesting that the worker 30 verify the quality of the sub-jobs 32A, 32B, and 32C, to which the worker 30 may respond. Once completed, the sub-jobs 32A, 32B, and 32C may be brought to a packaging station 26, where the sub-jobs 32A, 32B, and 32C may or may not be packed together. When the sub-jobs 32A, 32B, and 32C are scanned at the final location, the PSP controller 12 may close the sub-jobs 32A, 32B, and 32C and the sub-jobs 32A, 32B, and 32C may be shipped.

Figure 20:
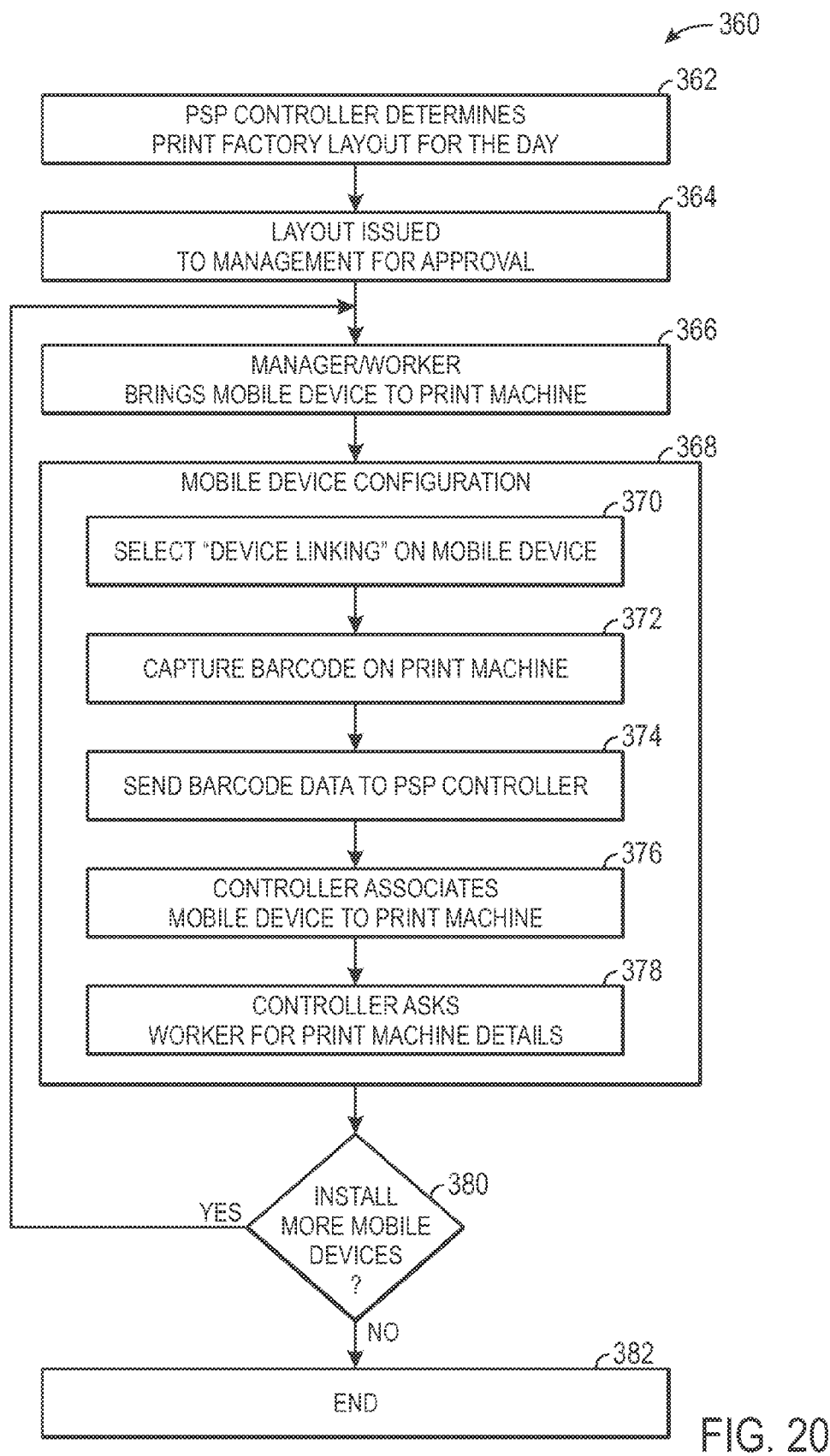
FIG. 20 is a flowchart describing a method for linking a mobile device to a print machine to enable the mobile device to track print jobs via RFID badges and/or barcode-enabled paper job tickets, in accordance with an embodiment.

As mentioned above with reference to FIG. 3, some mobile devices (e.g., slates 34 and/or handheld devices 36) may be variably assigned and/or linked to different print machines or groups of print machines on the PSP production floor 10 as needed. A flowchart 360 of FIG. 20 describes one manner of linking a mobile device, such as a slate 34 and/or handheld device 36, to a print machine on the PSP production floor 10. The flowchart 360 may begin when the PSP controller 12 determines a layout of print machines that will be in operation on the PSP production floor 10 at the beginning of the day or shift, as well as an allocation of which slates 34 and/or handheld devices 36 should be assigned to which print machines or workers 30 (block 362). By way of example, the PSP controller 12 may determine the allocation of slates 34 and/or handheld devices 36 using historical PSP production floor 10 data so as to reduce the constraints on production. The PSP controller 12 may issue this proposed layout to the manager 28 for approval (block 364). When the layout has been approved, the manager 28 and/or a worker 30 may bring a slate 34 and/or handheld device 36 to a print machine (e.g., the cutter 18D) (block 366).

The worker 30 may cause the selected mobile device to begin a linking procedure (block 368). For example, the worker 30 may select a "device linking" option on the slate 34 and/or handheld device 36 (block 370). The worker 30 may use a barcode scanner 80 or the camera 72 of the slate 34 and/or handheld device 36 to capture the unique identifier 42 located on the selected print machine (block 372). The slate 34 and/or handheld device 36 may transmit the data encoded on the unique identifier 42 to the PSP controller 12 (block 374). The PSP controller 12 then may associate that mobile device (e.g., the slate 34 and/or handheld device 36) to that print machine (e.g., the printing press 16D) (block 376). The PSP controller 12, if desired, may additionally request certain details regarding the print machine where the slate 34 and/or handheld device 36 has been installed (block 378), to allow the PSP controller 12 to gain a more accurate awareness of the situation on the PSP production floor 10. The above process may continue until there are no more mobile devices (e.g., slate 34 and/or handheld device 36) to be linked to print machines (decision block 380), as indicated by block 382. Additionally or alternatively, the slate 34 and/or handheld device 36 may be linked to more than one print machine in the manner described above.

Figure 21:
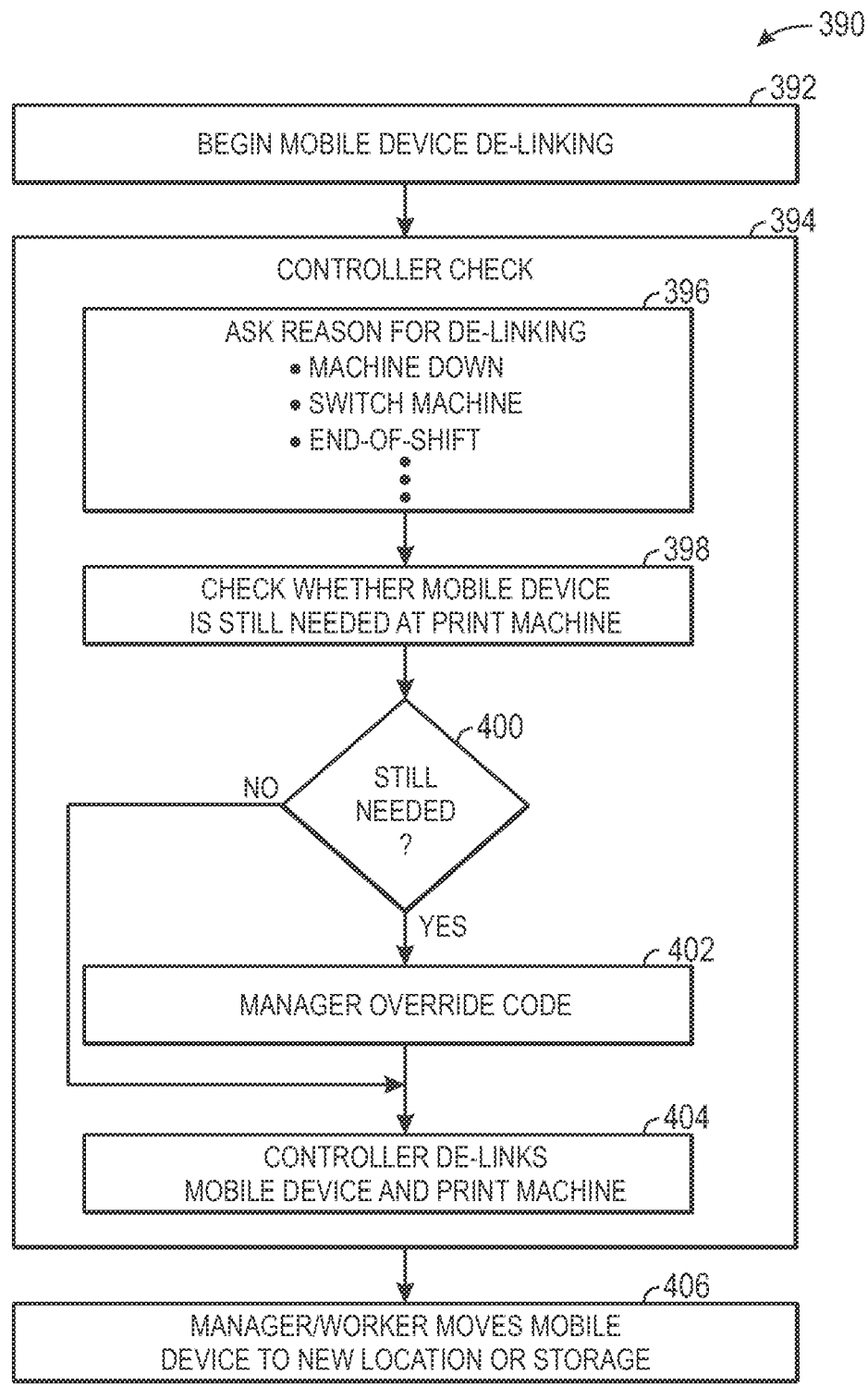
FIG. 21 is a flowchart describing a method for de-linking a mobile device from a print machine, in accordance with an embodiment.

At the end of the day or another time (e.g., at the end of a shift), the manager 28 or a worker 30 may de-link a slate 34 and/or handheld device 36 from a print machine. Thereafter, the newly de-linked slate 34 and/or handheld device 36 may be placed in storage or linked to another print machine. For example, as shown by a flowchart 390 of FIG. 21, a worker 30 may begin to perform a mobile device de-linking procedure to remove a link mobile device from a print machine (block 392). To de-link the mobile device from the print machine, the worker 30 may carry out a PSP controller check from the slate 34 and/or handheld device 36 to the PSP controller 12 (block 394). That is, the slate 34 and/or handheld device 36 may request a reason that the mobile device is being de-linked (block 396). By way of example, the worker 30 may indicate that the reason for de-linking is that the print machine has become unavailable, to switch to a different print machine for some other reason, or because the end of a shift is appearing on the PSP production floor 10. These reasons are intended to be representative and are not intended to be exhaustive.

The PSP controller 12 may determine whether the mobile device (e.g., the slate 34 and/or handheld device 36) is still needed at the print machine where it is currently linked (block 398). If the PSP controller 12 determines that the mobile device (e.g., the slate 34 and/or handheld device 36) is still needed (decision block 400), the PSP controller 12 may request a manager override code to be input onto the mobile device (e.g., the slate 34 and/or handheld device 36). Thereafter, the PSP controller 12 may disassociate the mobile device from the print machine (block 404). Having de-linked the mobile device (e.g., the slate 34 and/or handheld device 36), the manager 28 and/or worker 30 can move the mobile device to a new print machine or to storage (block 406).

The invention claimed is:

1. A method comprising:
    scanning a barcode-enabled job ticket assigned to a print job using a mobile electronic device assigned to a location on a print service provider production floor;
    sending barcode data from the barcode-enabled job ticket from the mobile electronic device to a print service provider controller;
    receiving on the mobile electronic device workflow instructions associated with the print job from the print service provider controller, wherein the workflow instructions comprise instructions indicating a subsequent processing step for the print job after completion of a current workflow step; and
    displaying on the mobile electronic device a representation of the workflow instructions that guides a worker in advancing the print job to the subsequent processing step.

2. The method of claim 1, wherein the barcode-enabled job ticket is scanned using the mobile electronic device, wherein the mobile electronic device is associated in the print service provider controller with at least one particular print machine or at least one particular print service provider worker, or both.

3. The method of claim 1, wherein the representation of the workflow instructions displayed on the mobile electronic device comprises:
    an indication of subsequent processes of a workflow associated with the print job;
    an indication of worker instructions to perform a particular workflow process associated with the print job;
    an indication of worker instructions to operate a print machine associated with the print job; or
    an indication of worker instructions to take the print job to a new print machine;
    an indication of a specification associated with the print job; or
    any combination thereof.

4. The method of claim 1, comprising displaying on the mobile electronic device a user-selectable representation of job status information associated with the print job and sending the job status information to the print service provider controller when a user selection of the user-selectable representation of the job status information occurs, wherein the user-selectable representation of job status information is displayed according to a statistical sampling methodology and is not displayed in association with every other print job.

5. The method of claim 4, wherein the job status information comprises:
    an indication that the print job has been picked up by a worker;
    an indication that the print job is located at a print machine;
    an indication that the print job is loaded in the print machine;
    an indication that the print job is scheduled to be processed by an unavailable print machine;
    an indication that a set-up procedure associated with a next process indicated by the workflow instructions has begun;
    an indication that the set-up procedure associated with the next process indicated by the workflow instructions has ended;
    an indication that the next process indicated by the workflow instructions has begun; or
    an indication that the next process indicated by the workflow instructions has ended; or
    any combination thereof.

6. The method of claim 1, wherein the workflow instructions comprise real-time instructions directing a worker to perform a particular workflow process associated with the print job after completion of a current workflow step.

7. The method of claim 1, wherein the workflow instructions comprise instructions directing the worker to take the print job to a particular location on the print service provider production floor after completion of a current workflow step.

8. The method of claim 1, wherein the workflow instructions comprise instructions explaining a step in a workflow associated with the print job.

9. An electronic device comprising:
    an input/output device configured to read a code associated with a print machine and a code associated with a print job located at the print machine;
    a network interface configured to:
        send an indication of the code associated with the print machine to a print service provider controller to link the print machine to the electronic device such that subsequent communication to the print service provider controller from the electronic device can be understood by the print service provider controller as relating to the print machine;
        send an indication of the code associated with the print job; and
        receive workflow instructions associated with the print job from the print service provider controller, wherein the workflow instructions comprise instructions indicating a subsequent processing step for the print job after completion of a current workflow step; and
    a display configured to display a representation of workflow instructions that guides a worker in advancing the print job to the subsequent processing step.

10. The electronic device of claim 9, wherein the network interface is configured to receive a message from the print service provider controller requesting worker input regarding a status of the print machine or a status of the print job, or both, after the electronic device is linked to the print machine.

11. The electronic device of claim 9, wherein the network interface is configured to send a message from to the print service provider controller to de-link the electronic device from the print machine such that subsequent communication from the electronic device to the print service provider controller is not understood as relating to the print machine or a print job located at or near the print machine.

12. The electronic device of claim 11, wherein the network interface is configured to receive a message from the print service provider controller requesting an override code and send the override code after the message requesting the override code has been received, wherein the display comprises a touch screen configured to obtain a worker input of the override code.

13. The electronic device of claim 9, wherein the electronic device comprises a mobile device in the form of a notebook computer, a slate computer, a handheld computer, or an e-reader, or any combination thereof.

14. An article of manufacture comprising:
  at least one tangible, machine-readable medium at least collectively storing processor-executable instructions, the instructions comprising:
  instructions to determine an allocation of a mobile electronic device to a print service provider worker or a print machine, or both, based at least in part on historical print service provider production floor data;
  instructions to link the mobile electronic device to the print service provider worker or the print machine, or both;
  instructions to receive a code associated with a print job from the mobile electronic device;
  instructions to determine workflow instructions associated with the print job, wherein the workflow instructions comprise instructions indicating a subsequent processing step for the print job after completion of a current workflow step; and
  instructions to send the workflow instructions to display on the mobile electronic device a representation of the workflow instructions that guides a worker in advancing the print job to the subsequent processing step.

15. The article of manufacture of claim 14, wherein the instructions to determine the allocation of the mobile electronic device comprise instructions not to allocate the mobile electronic device to a different print machine when the different print machine performs a process sufficiently low-risk and simple so as to be readily understood by a print service provider worker reading a simplified paper job ticket.

16. The article of manufacture of claim 14, wherein the instructions to determine the workflow instructions comprise instructions to determine the workflow instructions based at least in part on a skill level of the print service provider worker, a previous set-up of the print machine, a potential for errors associated with the print machine, or any combination thereof.

17. The article of manufacture of claim 14, wherein the instructions comprise instructions to receive job status information from the mobile electronic device associated with a workflow progress of the print job when the mobile electronic device is associated with the print machine and the print machine is not configured to communicate using the job definition format (JDF) or the job messaging format (JMF).

18. The article of manufacture of claim 17, wherein the instructions comprise instructions to determine print service provider production floor statistics based at least in part on the job status information and instructions to send an indication of the statistics to the mobile electronic device to enable visualization of the statistics on the mobile electronic device.

* * * * *